United States Patent
Ojha et al.

(10) Patent No.: US 11,431,754 B2
(45) Date of Patent: Aug. 30, 2022

(54) AUTHENTICATING TO SECURED RESOURCE VIA COUPLED DEVICES

(71) Applicant: Citrix Systems, Inc., Fort Lauderdale, FL (US)

(72) Inventors: Nivedita Ojha, Campbell, CA (US); Stephen Wilson, San Jose, CA (US); Derek Thorslund, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 83 days.

(21) Appl. No.: 16/730,304

(22) Filed: Dec. 30, 2019

(65) Prior Publication Data

US 2020/0213317 A1 Jul. 2, 2020

Related U.S. Application Data

(60) Provisional application No. 62/786,813, filed on Dec. 31, 2018.

(51) Int. Cl.
*H04L 9/40* (2022.01)
*H04W 36/30* (2009.01)
(Continued)

(52) U.S. Cl.
CPC .......... *H04L 63/20* (2013.01); *H04L 41/0668* (2013.01); *H04L 41/0681* (2013.01); *H04L 41/5019* (2013.01); *H04L 45/22* (2013.01); *H04L 45/24* (2013.01); *H04L 45/28* (2013.01); *H04L 63/0272* (2013.01); *H04L 63/08* (2013.01); *H04L 63/0853* (2013.01);
(Continued)

(58) Field of Classification Search
None
See application file for complete search history.

(56) References Cited

U.S. PATENT DOCUMENTS 8,935,532 B2 * 1/2015 Mittal ..................... G06F 21/10
726/28
9,021,574 B1 * 4/2015 Flowers .............. H04L 63/0227
713/153
(Continued)

FOREIGN PATENT DOCUMENTS

EP 3343962 7/2018
EP 3343962 A1 * 7/2018 ............ H04W 8/005
(Continued)

OTHER PUBLICATIONS

Kubovy et al "A Secure Token-based Communication for Authentication and Authorization Servers," Nov. 2016, pp. 1-16 (Year: 2016).*
(Continued)

*Primary Examiner* — Luu T Pham
*Assistant Examiner* — James J Wilcox
(74) *Attorney, Agent, or Firm* — BainwoodHuang

(57) ABSTRACT

A technique for performing authentication includes a first device receiving security data from a second device that shares its network connection with the first device. The first device applies the security data received from the second device when requesting authentication to a secured resource on the network. For example, the security data may include a token code or other data that may be used as a token, such as identification information about the second device.

15 Claims, 14 Drawing Sheets

(51) Int. Cl.

| | |
|---|---|
| *H04L 41/0668* | (2022.01) |
| *H04L 41/0681* | (2022.01) |
| *H04L 41/5019* | (2022.01) |
| *H04L 45/00* | (2022.01) |
| *H04L 45/24* | (2022.01) |
| *H04L 45/28* | (2022.01) |
| *H04W 24/04* | (2009.01) |
| *H04W 12/63* | (2021.01) |
| *H04W 88/04* | (2009.01) |
| *G06F 8/65* | (2018.01) |
| *G06F 21/56* | (2013.01) |
| *H04W 76/15* | (2018.01) |

(52) U.S. Cl.
CPC ............ *H04L 63/10* (2013.01); *H04W 12/63* (2021.01); *H04W 24/04* (2013.01); *H04W 36/305* (2018.08); *H04W 76/15* (2018.02); *H04W 88/04* (2013.01); *G06F 8/65* (2013.01); *G06F 21/566* (2013.01); *G06F 2221/034* (2013.01); *H04L 63/107* (2013.01)

(56) References Cited

U.S. PATENT DOCUMENTS

| | | | |
|---|---|---|---|
| 9,509,692 B2* | 11/2016 | Innes | H04L 63/0823 |
| 9,762,576 B2* | 9/2017 | Dispensa | H04L 63/0869 |
| 10,044,674 B2 | 8/2018 | Liu et al. | |
| 10,325,085 B1* | 6/2019 | Mortensen | G06F 21/40 |
| 11,140,157 B1* | 10/2021 | Xia | H04L 63/0853 |
| 2004/0190718 A1* | 9/2004 | Dacosta | H04W 12/06 380/247 |
| 2005/0163093 A1 | 7/2005 | Garg et al. | |
| 2008/0168544 A1* | 7/2008 | von Krogh | G06F 21/445 713/400 |
| 2008/0209213 A1* | 8/2008 | Astrand | H04L 63/18 713/168 |
| 2010/0124196 A1 | 5/2010 | Bonar et al. | |
| 2010/0202345 A1* | 8/2010 | Jing | H04W 16/18 370/328 |
| 2011/0117966 A1* | 5/2011 | Coppinger | G06Q 20/105 455/558 |
| 2011/0237223 A1* | 9/2011 | Coppinger | H04L 63/0853 455/411 |
| 2011/0237224 A1* | 9/2011 | Coppinger | G06Q 20/20 455/411 |
| 2011/0237296 A1* | 9/2011 | Coppinger | H04L 67/306 455/558 |
| 2011/0238579 A1* | 9/2011 | Coppinger | H04L 63/0853 705/67 |
| 2011/0238580 A1* | 9/2011 | Coppinger | G06Q 20/20 705/65 |
| 2011/0244920 A1* | 10/2011 | Coppinger | G06Q 20/20 455/558 |
| 2011/0246317 A1* | 10/2011 | Coppinger | H04L 63/0853 705/17 |
| 2012/0204245 A1* | 8/2012 | Ting | H04L 9/3228 726/8 |
| 2012/0331287 A1* | 12/2012 | Bowman | H04L 9/0844 713/155 |
| 2013/0103785 A1 | 4/2013 | Lyon | |
| 2013/0226799 A1* | 8/2013 | Raj | G07C 9/00 705/44 |
| 2015/0100788 A1* | 4/2015 | Chastain | H04L 63/0853 713/168 |
| 2015/0121482 A1 | 4/2015 | Berman et al. | |
| 2015/0319161 A1* | 11/2015 | Dimmick | H04W 4/025 726/4 |
| 2015/0351004 A1* | 12/2015 | Ko | H04W 4/80 455/434 |
| 2016/0149880 A1* | 5/2016 | Paczkowski | H04L 63/101 726/4 |
| 2016/0182655 A1 | 6/2016 | Entezari et al. | |
| 2016/0295622 A1* | 10/2016 | Huang | H04W 76/30 |
| 2016/0301761 A1* | 10/2016 | Sanchez-Sandoval | H04M 1/72469 |
| 2016/0344730 A1* | 11/2016 | Holz | H04L 63/0876 |
| 2017/0019400 A1* | 1/2017 | Drolshagen | H04L 63/0861 |
| 2017/0195121 A1 | 7/2017 | Frei et al. | |
| 2017/0201515 A1* | 7/2017 | Clark | H04L 63/08 |
| 2017/0310445 A1 | 10/2017 | Kalligudd | |
| 2018/0248892 A1 | 8/2018 | Hefetz | |
| 2018/0302414 A1* | 10/2018 | Wagner | G06Q 20/3224 |
| 2018/0351943 A1* | 12/2018 | Yasukawa | G06F 21/33 |
| 2019/0074972 A1* | 3/2019 | Shastri | G06F 21/36 |
| 2019/0095655 A1* | 3/2019 | Krawczewicz | H04L 9/32 |
| 2019/0149539 A1* | 5/2019 | Scruby | H04L 63/0807 713/168 |
| 2020/0153792 A1* | 5/2020 | Huang | H04W 12/06 |
| 2020/0186607 A1* | 6/2020 | Murphy | H04L 9/0637 |
| 2020/0267553 A1* | 8/2020 | Wagner | H04L 63/0861 |
| 2021/0204102 A1* | 7/2021 | Han | H04W 4/48 |

FOREIGN PATENT DOCUMENTS

| | | | | |
|---|---|---|---|---|
| KR | 101688812 | 12/2016 | | |
| WO | 20140116528 | 7/2014 | | |
| WO | WO-2014116528 A2 * | 7/2014 | | H04L 63/0853 |

OTHER PUBLICATIONS

Machine Translation of KR101688812B1; 21 pages.

* cited by examiner

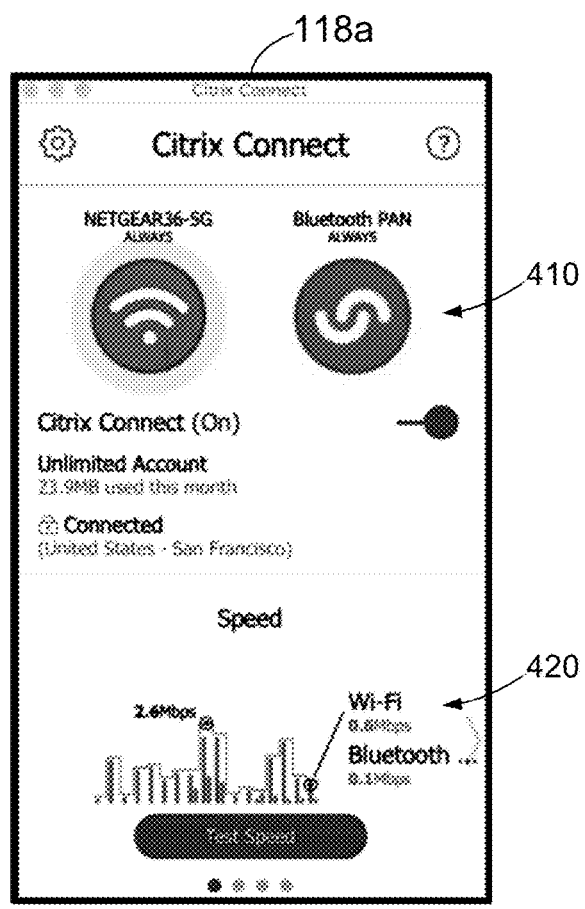
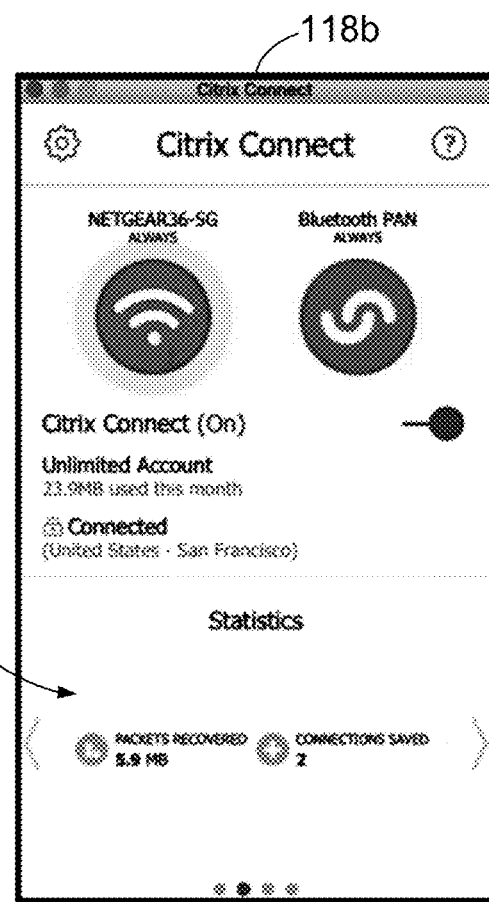
FIG. 4a  FIG. 4b

AUTHENTICATING TO SECURED RESOURCE VIA COUPLED DEVICES

CROSS-REFERENCE TO RELATED APPLICATION(S)

This application claims the benefit of U.S. Provisional Application No. 62/786,813, filed Dec. 31, 2018, the contents and teachings of which are incorporated herein by reference in their entirety.

BACKGROUND

It is common for modern computing devices to support multiple network connections. For example, a laptop computer might support Ethernet, Wi-Fi (IEEE 802.11x), and/or cellular network connections. If one network connection fails, a user has the option to change networks, e.g., by accessing network settings on the laptop and selecting a different network.

Some devices change network connections automatically. For example, a user of a smartphone might start listening to a podcast at home, where the smartphone is connected to Wi-Fi, but then might decide to continue listening outside. When the user gets out of Wi-Fi range, the smartphone detects the loss of Wi-Fi and switches over to cellular service. With adequate buffering, the transition may appear seamless, and the user may never notice that there has been a connection failure and then a failover from Wi-Fi to cellular service.

SUMMARY

Unfortunately, certain applications do not support seamless transitions when the devices on which they run switch networks. For example, applications like web conferencing, which involve real-time interactivity, may temporarily freeze when network connections change. In some cases, establishing a new connection may require handshaking or other communications, which can extend the durations of outages. Even if outages are only momentary, they can still cause frustration and annoyance and diminish user experience.

In contrast with these conventional approaches, a technique disclosed herein maintains multiple network paths simultaneously, exchanging the same data redundantly through the network paths and allowing a receiver to select one of the network paths as its source of data. In the event that a first, currently-selected network path becomes weak, for example, the receiver can automatically and seamlessly switch its source of data to a second network path, while the first network path remains operational. Given that the second network path is already on and conveying data, the transition is nearly instantaneous. Even highly interactive applications running in environments having network dead zones or interference can remain fully functional with generally no downtime.

In some arrangements, a first device may establish an additional connection to a network by operatively coupling to a second device. For example, the first device may connect to Wi-Fi and may also connect, e.g., via Bluetooth, Wi-Fi, or cable, to the second device, which is configured to share its cellular data connection with the first device. The first device then has the benefit of both its own Wi-Fi connection and the second device's cellular connection.

The first device can thus benefit from the reliability of having an additional network path. We have observed that this arrangement also lends itself to enhanced security and/or user convenience when performing authentication.

Along these lines, an improved authentication technique includes a first device that receives security data from a second device that shares its network connection with the first device. The first device applies the security data received from the second device when requesting authentication to a secured resource on the network. For example, the security data may include a token code or other data that may be used as a token, such as identification information about the second device. Using the improved technique, the first device effectively leverages the presence of the second device to increase authentication strength and/or convenience. In cases where a user is involved, some embodiments may proceed automatically and transparently to the user, promoting user experience as well as security.

Certain embodiments are directed to a method that includes receiving, by a first device having a first connection to a computer network, security data from a second device having a second connection to the computer network and sharing the second connection with the first device. The security data indicates a trusted relationship previously established between the second device and a server. The method further includes sending, by the first device, a request to the server to access a secured resource on the computer network, the request including an indicator based on the received security data from the second device and directing the server to perform authentication based at least in part on the indicator. In response to authentication of the request based at least in part on the security data received from the second device, the method still further includes accessing the secured resource by the first device.

Other embodiments are directed to a computerized system that includes a first device having a first connection to a computer network, a second device having a second connection to the computer network and configured to share the second connection with the first device via tethering, and a server connected to the computer network and configured to selectively allow authenticated access to a secured resource. The first device is configured to receive security data from the second device and to send an authentication request to the server for accessing the secured resource. The authentication request includes an indicator based on the security data. The server is configured to receive the authentication request and to perform an authentication operation based at least in part on the indicator. The first device is configured to access the secured resource responsive to a successful result of the authentication operation.

Further embodiments are directed to a method performed by a server. The method includes receiving an authentication request from a first device for accessing a secured resource, the authentication request including an indicator based on security data obtained by the first device from a second device to which the first device is coupled for providing a network connection. In response to receiving the authentication request, the method further includes performing authentication based at least in part on the indicator. In response to authentication of the request, the method further includes providing the first device with access to the secured resource.

Additional embodiments include any method described above realized as a computerized apparatus constructed and arranged to carry out the respective method, as well as a computer program product including a set of non-transitory, computer-readable media having instructions which, when executed by control circuitry, cause the control circuitry to perform the respective method. Further embodiments include any computerized apparatus or system described above realized as a respective method or computer program product. Still further embodiments include any computer program product described above realized as a respective method or computerized apparatus.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIGS. 4a-4d are simulated screenshots of a graphical user interface (GUI) of a client application component.

DETAILED DESCRIPTION

Embodiments of disclosed techniques will now be described. One should appreciate that such embodiments are provided by way of example to illustrate certain features and principles but are not intended to be limiting.

This document is provided in the following sections to assist the reader:
Section I presents an example environment and technique for improving network reliability through the use of multiple, simultaneous network paths.
Section II presents an example technique for using a second device to improve authentication strength and/or convenience of authentication requests made by a first device tethered to the second device.

The techniques disclosed in Sections I and II may be used together or independently. Although each technique may benefit from the features of the other, neither technique is required to be used with the other.

Section I: Example Environment and Technique for Maintaining Multiple, Simultaneous Network Paths A technique for operating an application maintains multiple, simultaneous network paths, exchanging the same data redundantly through the network paths and enabling a receiver to select one of the network paths as a source of the data.

Figure 1:
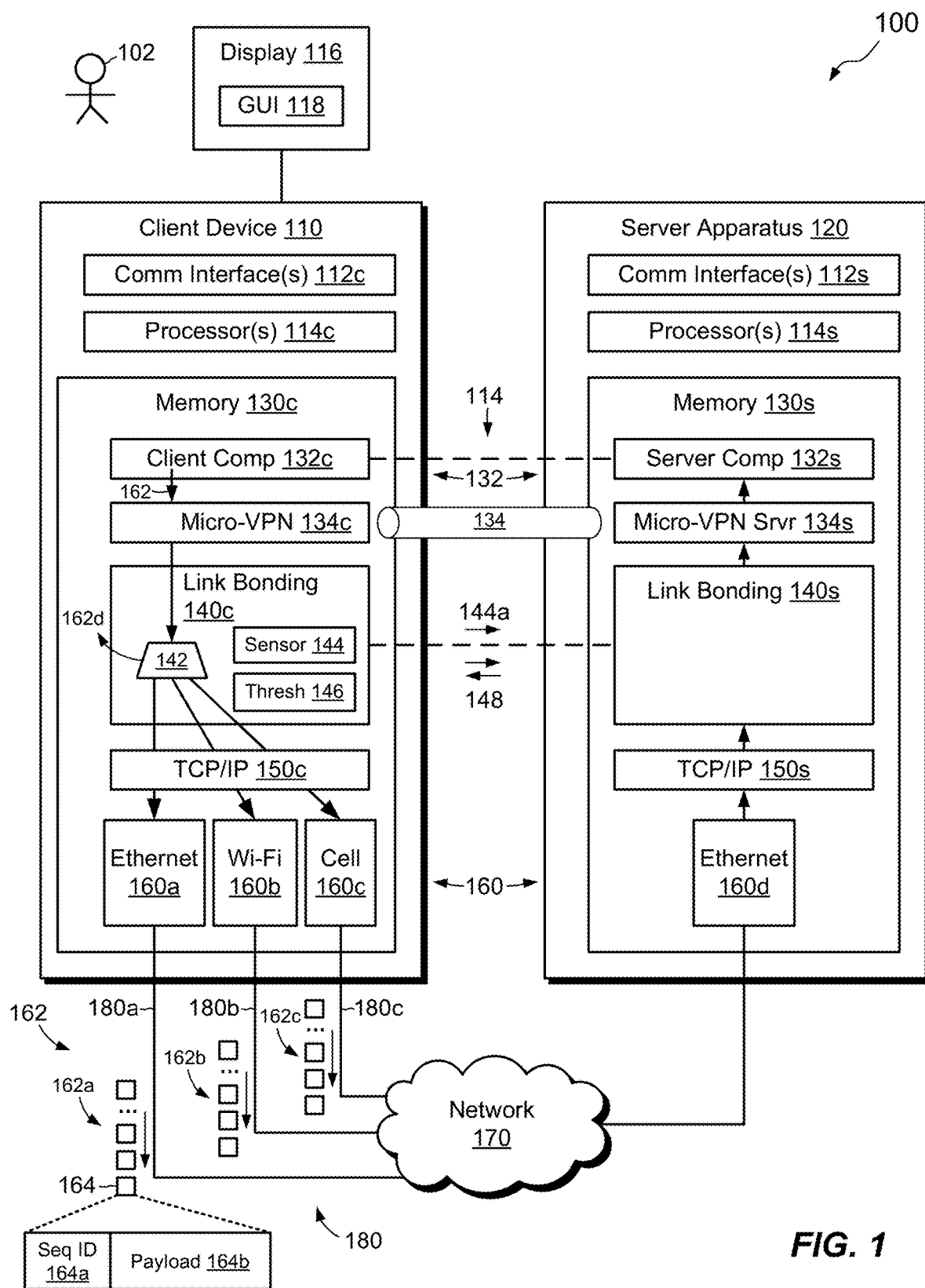
FIG. 1 is a block diagram of an example environment in which embodiments of the disclosed technique can be practiced.

FIG. 1 shows an example environment 100 in which embodiments of the disclosed technique can be practiced. Here, a client device 110 ("client") is operatively connected to a server apparatus 120 ("server") over a network 170, such as a local area network (LAN), a wide area network (WAN), the Internet, and/or some other type of network or combination of networks. The client 110 may be provided as any user-operable computer or device, such as a laptop computer, desktop computer, tablet computer, smart phone, personal data assistant, set-top box, gaming system, or the like. The server 120 may be provided in a similar form, but is typically a server-grade computer that runs in a data center and is available "in the cloud," meaning on the Internet. In some examples, the server 120 is implemented using multiple computers, as part of a distributed server or server cluster.

The client 110 is connected to the network 170 via multiple paths 180, which may include an Ethernet path 180a, a Wi-Fi path 180b, and a cellular data path 180c, for example. A greater or fewer number of paths 180 may be provided, and the disclosure is not limited to any particular type or types of paths. In an example, the cellular data path 180c is an LTE (Long-Term Evolution) data path. The client 110 has a display 116, such as a monitor, touch screen, or the like, and the display 116 is configured to render a graphical user interface (GUI) 118, which may be operated by a user 102.

As shown, the client 110 includes one or more communication interfaces 112c, such as an Ethernet port, a Wi-Fi antenna, a cellular antenna, and/or the like. The client 110 also includes a set of processors 114c, such as one or more processing chips and/or assemblies, and memory 130c, which may include both volatile memory, e.g., RAM (Random Access Memory), and non-volatile memory, such as one or more ROMs (Read-Only Memories), disk drives, solid state drives, and the like. The set of processors 114c and the memory 130c together form client control circuitry, which is constructed and arranged to carry out various client methods and functions as described herein. Also, the memory 130c includes a variety of software constructs realized in the form of executable instructions. When the executable instructions are run by the set of processors 114c, the processor(s) carry out the operations of the software constructs. Although certain software constructs are specifically shown and described, it is understood that the memory 130c typically includes many other software components, which are not shown, such as an operating system, various applications, processes, and daemons.

The configuration of the server 120 may be similar to that of the client 110, with communication interface(s) 112s, processor(s) 114s, and memory 130s. The processor(s) 114s and memory 130s form server control circuitry, which is constructed and arranged to carry out various server methods and functions as described herein. When the executable instructions on the server 120 are run by the processor(s) 114s, the processor(s) carry out the operations of the software constructs.

As further shown in FIG. 1, the memory 130c of client 110 "includes," i.e., realizes by execution of software instructions, a client component 132c of a software application 132, a micro-VPN (Virtual Private Network) client 134c, and a link bonding client 140c. The memory 130c further includes a TCP/IP (transmission control protocol/Internet protocol) driver 150c, as well as additional drivers 160, such as Ethernet driver 160a, Wi-Fi driver 160b, and cellular data driver 160c.

Turning now to the server 120, the memory 130s includes a server component 132s of the software application 132, a micro-VPN server 134s, and a link bonding service 140s. The memory 130s further includes a TCP/IP driver 150s, as well as one or more drivers 160 for one or more connection paths 180. In a particular example, the server 120 uses only a single connection path, such as Ethernet, which is accessed via an Ethernet driver 160d.

In an example, the micro-VPN client 134c and the link bonding client 140c are provided as respective software libraries, with each library having its own API (Application Program Interface) for exposing its respective functions. In addition, the micro-VPN client 134c and the link bonding client 140c may each be "scoped" to the client component 132c of the application program 132, meaning that their functionality is limited to communications involving the application program 132 and does not generally extend to other programs running on the client device 110. For example, the micro-VPN client 134c coordinates with the micro-VPN server 134s to establish an encrypted channel, such as a network tunnel 134, which is limited to communications over the network 170 between the client component 132c and the server component 132s. Rather than the tunnel 134 applying to the entire client device 110 (which is a common arrangement for conventional VPNs), the tunnel 134 can instead be restricted to network traffic of the application program 132 that passes between the client 110 and the server 120. In this arrangement, other network activity conducted by other programs running on the client device 110 may fall outside of the tunnel 134, where such activity is not secured by the tunnel 134. The micro-VPN thus provides the network tunnel 134 for a particular application, rather than for the client machine 110 as a whole. Among other things, this feature enables the micro-VPN, along with the link bonding client 140c and client application code 132c, to be provided in a single downloadable package (see FIG. 2), which can be installed on the client device 110, avoiding the need for multiple installation procedures and keeping all the related parts together. In an example, the micro-VPN client 134c and server 134s are configured to establish the encrypted channel by performing encryption and decryption of data passed through the tunnel 134. They may also be configured to restrict connections to designated resources on the network 170, e.g., by applying a white list of allowed sites and/or a black list of blocked sites. One should appreciate that the term "channel" as used herein is not limited to any one network path but rather encompasses all communication over all of the network paths 180. The link bonding client 140c is configured to direct outgoing data (from the client component 132c) over multiple network paths 180, and to receive incoming data arriving over the network paths 180, selecting one of the network paths as a source of data to be provided to the client component 132c. In a similar manner, the link bonding server 140s is configured to direct outgoing data (from the server component 132s) over the network paths 180, and to receive incoming network data arriving over the same network paths 180, selecting one of the network paths 180 as a source of data to be provided to the server component 132s. In some examples, the link bonding client 140c and the link bonding service 140s operate at the data link layer (layer 2) of the OSI (Open Systems Interconnection) model, but this is not required. Although the micro-VPN client component 132c and link bonding client component 140c are shown herein as software libraries, they may alternatively be implemented at least in part using hardware and/or firmware. Also, one should appreciate that the micro-VPN client and server and link bonding client and service are merely illustrative and are not intended to be limiting.

In an example, the application program 132 is a SaaS application. The client component 132c may be a web browser or other client-side program that runs web pages and/or other content downloaded from the server component 132s. In an example, the application program 132 is a workspace framework, i.e., a software environment that provides user access to multiple sub-applications from a single interface. Such sub-applications run within the workspace framework, with incoming and outgoing data of those sub-applications passing through the tunnel 134 via the link bonding component 140c. According to some examples, the tunnel 134 applies to all application traffic to and from the application framework.

In example operation, user 102 of the client device 110 launches the client component 132c, e.g., by clicking or tapping a shortcut or by navigating in a browser. Based on previously-established associations 114, the client component 132c connects over the network 170 to the server component 132s and the tunnel 134 is established by action of the micro-VPN client 134c and the micro-VPN server 134s. The link bonding client 140c and the link bonding service 140s may then exchange messages 148 through the tunnel 134. The link bonding client 140c uses the messages 148 as a basis for measuring network performance over the paths 180. For example, sensor 144 measures network speed, e.g., as round-trip delay (using a ping utility), bandwidth, or the like. In an example, sensor 144 separately measures network speed or bandwidth over each of the paths 180 and may repeat its measurements more or less continuously, or at regular intervals, such as once every 50 ms (milliseconds). Although messages 148 are shown as a dotted line that directly connects the link bonding client 140c and server 140s, such messages in actuality pass through the network 170, e.g., via client and server-side drivers 160, and through any supporting infrastructure for each path 180 (e.g., cell phone towers, routers, Internet service providers, and so forth). In this manner, sensor 144 obtains real-time measurements of each path 180. In some examples, the sensor 144 identifies a selected path 144a, i.e., one of the paths 180 that provides the highest speed, bandwidth, consistency, economy, and/or the like, and alerts the link bonding service 140s on the server 120 of the identity of the selected path 144a, e.g., in an indicator, sent over the network 170, that identifies the selected path 144a.

As the user 102 operates the GUI 118 to control the application 132, the client 110 sends application data 162 to the network 170 over all paths 180, at substantially the same time and in parallel. For example, the link bonding client 140c passes the outgoing application data 162 to the TCP/IP driver 150c. The TCP/IP driver 150c uses multi-path routing to forward the application data to the Ethernet driver 160a, the Wi-Fi driver 160b, and the cellular data driver 160c. The client device 110 then sends out the packets 162a, 162b, and 162c via the Ethernet port, the Wi-Fi antenna, and the cell phone antenna. Packets 162a, 162b, and 162c all convey the same data 162 and pass through the network 170 in parallel and at the same time, or nearly so, with any differences among them deriving from differing delays along the paths 180. In an example, all application data 162 sent through all paths passes through the tunnel 134.

At the server 120, packets 162a, 162b, and 162c arrive at driver 160a and pass to the TCP/IP driver 150s and then to the link bonding service 140s. The link bonding service 140s, having obtained the identity of the selected path 144a based on the indicator sent from the client device 110, proceeds to discard all packets arriving over all of the other paths. For example, if the Ethernet path 180a was established as the selected path 144a, then the link bonding service 140s would discard all packets 162b and 162c, allowing only packets 162a to pass to the server component 132s. One should appreciate that the server 120 receives packets 162 via all paths 180, even if the server 120 includes only an Ethernet connection, as the packets 162 originate from different sources and travel through different paths 180 on their way to the server 120.

As shown at the bottom of FIG. 1, a packet 164, which is intended to be representative of all packets, includes a sequence identifier 164a and a payload 164b. The sequence identifier 164a is unique to each packet, but duplicates of the same packet having the same sequence identifier 164a may be sent over different paths 180. In one example, the link bonding service 140s discards arriving packets based on matching of sequence identifiers 164a. For example, the link bonding service 140s maintains a list of sequence identifiers 164a of all recently received packets and discards redundant packets having the same sequence identifiers 164a as those already on the list. The link bonding service 140s may use other approaches for distinguishing packets. For example, particular port designations or other designators in the packet may identify the path 180 over which the packet was transmitted. In such cases, the link bonding service 140s may discard packets whose port designations or other designators do not match that of the selected path 144a.

When the server 120 sends application data 162 to the client device 110, the link bonding service 140s passes the application data to the TCP/IP driver 150s and through the Ethernet driver 160d to the network 170. The server 120 sends the same application data redundantly in packets directed to all paths 180, such that the same packets arrive at the client device 110 via all of the paths 180 in parallel. The server 120 thus sends packets via all paths 180, even though the server 120 may connect to the network 170 using Ethernet only.

Drivers 160a, 160b, and 160c on the client device 110 receive the packets 162 and pass them to the TCP/IP driver 150c, which passes them to the link bonding client 140c. A selector 142 in the link bonding client 140c assigns the selected path 144a as the source of packets from the server component 132s. The selector discards packets 162d from all paths not designated as the selected path 144a, and passes the packets from the selected path 144a to the client component 132c. In an example, the selector 142 identifies packets arriving over the selected path 144a using the same techniques described above in connection with the server.

In an example, the sensor 144 continuously or repeatedly monitors network speed over the paths 180. If another path performs better than the current selected path 144a, e.g., in terms of speed, economy, etc., then the link bonding client 140c may select the better-performing path as a new selected path 144a and communicate the new selected path 144a to the link bonding service 140s. In a particular example, only Wi-Fi and LTE paths are available. The link bonding service 140s may then select Wi-Fi by default. If Wi-Fi speed falls below a designated threshold 146, the link bonding client 140c may choose LTE as the new selected path 144a. In some examples, the link bonding client 140c only switches to LTE when the current Wi-Fi speed drops below the current LTE speed. If Wi-Fi speed later recovers, the link bonding client 140c may reassign the selected path 144a to Wi-Fi. The assignment of selected path 144a is consequential in that it determines which packets are passed to the client component 132c and which packets are discarded. It may also determine which packets the link bonding service 140s on the server 120 passes to the server component 132s and which packets it discards. In an example, the assignment of the selected path 144a does not affect outgoing data transmitted by the client 110 or the server 120, however, as transmission is conducted over all paths 180 in parallel, regardless of the current selected path 144a.

With the arrangement as described, the client device 110 monitors speed of the paths 180 and selects the selected path 144a at any given time. If Wi-Fi suddenly becomes weak, e.g., because the user 102 has moved into a Wi-Fi dead spot, operation seamlessly and transparently switches to LTE (or to some other path). When the user 102 comes back into an active Wi-Fi area, operation seamlessly and transparently switches back to Wi-Fi. The user 102 need never know that the switching has occurred and typically experiences no disruption in service.

In some examples, the client 110 may save power and/or cost by temporarily shutting down the cellular data connection. For example, if Wi-Fi signal strength and/or speed as measured by sensor 144 are consistently high, the client 110 may temporarily close the LTE connection and proceed with Wi-Fi-only communications. Speed testing by sensor 144 may continue, however, and if Wi-Fi speed or signal strength starts to decline, the client 110 may reestablish the LTE connection. Preferably, the client 110 reconnects via LTE before the Wi-Fi signal becomes unusable, such that switching from Wi-Fi to LTE can proceed seamlessly prior to complete loss of the Wi-Fi signal. In some examples, the GUI 118 includes a control that allows the user 102 to turn off an undesired path. For example, if the user 102 is in an area with a strong Wi-Fi signal and does not intend to move during the course of a session, the user 102 might operate the GUI 118 to turn off LTE, thereby reducing power consumption associated with LTE processing and possibly reducing costs, which may be based on minutes used.

One should appreciate that the choice of selected path 144a may be based on a variety of factors. These may include, for example, speed, bandwidth, round-trip time, variability in network strength, interference (e.g., as measured based on numbers of dropped packets), and cost. Such factors may be combined in any suitable way, such as using combinatorial logic, weighted sums, fuzzy logic, machine learning, neural nets, and the like. Although the selected path 144a may be the fastest path in many cases, this is not required. For example, a slower path that is still fast enough to provide good user experience might be chosen as the selected path 144*a* if it is inexpensive to use and/or has other advantages.

Although a main operating mode of embodiments hereof is to keep multiple network paths active at the same time, such embodiments are not required to work this way all the time. For example, if a network path, such as Wi-Fi, is found to provide a consistently strong signal and is free to use, Wi-Fi may be chosen as the selected path 144*a* and operation over other network paths may be shut down. In a like manner, network paths that require high power consumption may be shut down temporarily to conserve battery life of the client device 110. Any paths 180 that have been shut down may be revived if the sensor 144 detects a drop in performance of the selected path 144*a*.

Further, although a single selected path 144*a* has been described, some embodiments allow for multiple selected paths, such as one for download to the client device 110 and another for download to the server 120. Accordingly, the selector 142 in the client device 110 chooses the selected path for the client device, whereas a similar selector (not shown) in the server 120 chooses the selected path for the server 120. Allowing selected paths to differ for client and server reflects differences in upload versus download performance, which is common to many types of network paths. In these circumstances, measurements used as a basis for choosing the selected paths may be based on unidirectional delays rather than on round-trip delays. According to some variants, a separate computer or other facility may monitor network speed or bandwidth on behalf of the client device 110 and/or server 120.

Figure 2:
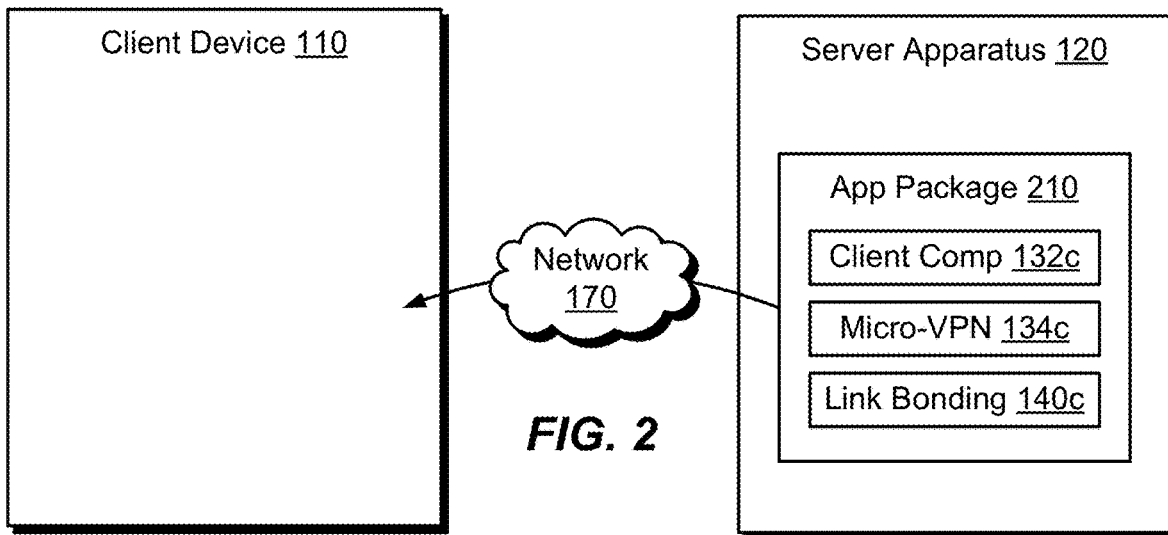
FIG. 2 is a block diagram showing an example arrangement for downloading a SaaS (Software as a Service) application from a server to a client.

FIG. 2 shows an example arrangement for installing an application program on the client device 110. Here, the server 120 stores a downloadable application package 210, which may be provided, for example, as a compressed archive, and which includes code for implementing the client component 132*c*, the micro-VPN client 134*c*, and the link bonding client 140*c*. To install the application program 132, the client device 110 contacts the server 120, e.g., via a website, and downloads the application package 210 to the client device 110 over the network 170. The client device 110 then opens the application package 210, decompresses any compressed contents, and installs the components. As all three components 132*c*, 134*c*, and 140*c* are provided together in a single package 210, the client device 110 is able to install all necessary components for supporting encrypted, multipath operation of the application program 132 via a single download.

Figure 3:
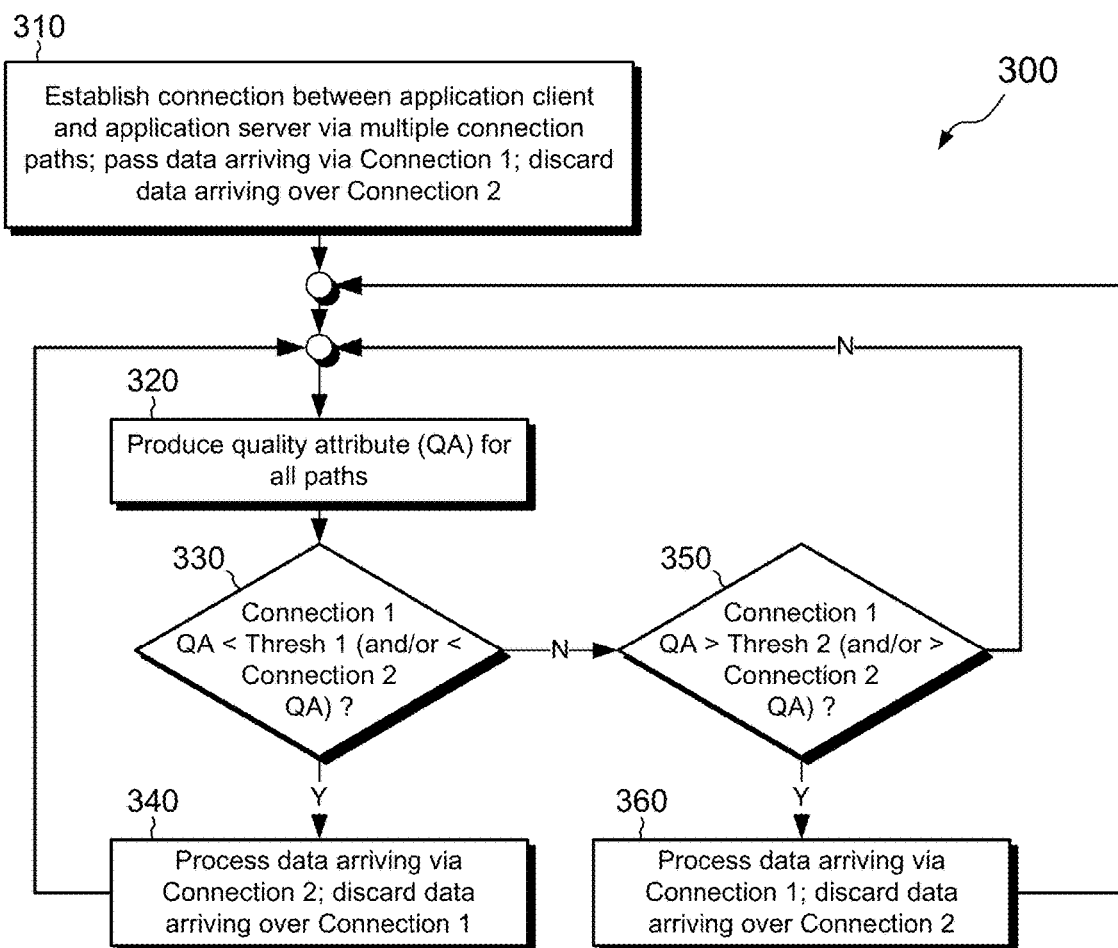
FIG. 3 is a flowchart showing an example method for operating a client and/or server in the environment of FIG. 1.

FIG. 3 shows an example method 300 for seamlessly and transparently switching between two connection paths, such as Wi-Fi and LTE, based on a quality attribute, which may itself be based on speed, bandwidth, network consistency, and/or cost; i.e., any of the factors described above for choosing the selected path 144*a*. Although the method 300 focuses on two connection paths 180, the method 300 may be extended to any number of such paths. Also, although the depicted acts are shown in a particular order, the order may be varied and some acts may be performed simultaneously.

At 310, a communication session is established between the application client 132*c* and the application server 132*s*, e.g., as a result of the user 102 launching the client component 132*c*. In an example, the communication session takes place via the tunnel 134 established between the micro-VPN client 134*c* and the micro-VPN server 134*s*. A respective network connection is configured via each connection path 180, and all communications between the client component 132*c* and the server component 132*s* pass through the tunnel 134, for all paths 180. The link bonding client 140*c* identifies a currently selected path 144*a* and proceeds to pass data (e.g., packets) that arrive via that selected path 144*a* to the client component 132*c*. Thus, the link bonding client 140*c* uses the selected path 144*a* as its sole source for all incoming application data 162 and discards data 162 arriving via the other paths. In an example, prior to the sensor 144 making any network measurements, the link bonding service 140*c* defaults to Wi-Fi as the initial selected path 144*a*, switching to another path only if no Wi-Fi signal is detected.

At 320, the sensor 144 in the link bonding client 140*c* measures the connections over all paths 180, e.g., by using ping commands, bandwidth measurements, and/or other approaches, and produces a quality attribute (QA) for each connection path 180. In some examples, the quality attribute is based solely on speed of the respective path. In other examples, the quality attribute is based on any combination of factors, which may include speed, bandwidth, cost, and/or consistency, for example.

At 330, the link bonding client 140*c* determines whether the quality attribute of the Wi-Fi path (Connection 1) has fallen below a threshold 146 (Thresh 1). The threshold may be predetermined or dynamically established, for example. The link bonding client 140*c* may also determine whether the quality attribute of Wi-Fi is less than that of LTE (Connection 2). The link bonding client 140*c* may apply these determinations in the alternative or in any combination.

If the quality attribute of Wi-Fi has fallen below Thresh 1 and/or below that of LTE, then operation proceeds to 340, whereupon the link bonding client 140*c* proceeds to process data arriving via LTE, discarding any data arriving via Wi-Fi. The link bonding client 140*c* may communicate this change in an attribute sent to the link bonding service 140*s*, which may also process arriving data via the LTE path, discarding data arriving via Wi-Fi. Operation then returns to 320, whereupon production of quality attributes and determinations are repeated.

At 330, if the quality attribute for Wi-Fi has not fallen below Thresh 1 and/or below that of LTE, then operation proceeds instead to 350, whereupon the link bonding client 140*c* determines whether the quality attribute of the Wi-Fi path (Connection 1) exceeds a second threshold (Thresh 2, which is preferably slightly higher than Thresh 1) and/or exceeds the quality attribute of LTE. If not, operation returns to 320; otherwise, operation proceeds to 360, whereupon the link bonding client 140*c* proceeds to process data arriving via Wi-Fi, discarding any data arriving via LTE. As before, the link bonding client 140*c* may communicate this change to the link bonding server 140*s*, which may also process data arriving via the Wi-Fi path, discarding data arriving via LTE. Operation then returns to 320, where the above-described acts are repeated. Thresh 2 may be predetermined or dynamically established, for example.

Operation may proceed in this fashion indefinitely, as long as the application program 132 continues to run. A rationale for making Thresh 2 slightly higher than Thresh 1 is to prevent operation from chattering between sources when quality attributes are close to Thresh 1. If this is not a concern, then Thresh 2 may simply be set to Thresh 1 (i.e., the same threshold may be used for both). One should appreciate that Thresh 1 and Thresh 2 may be established in any suitable way. For example, Thresh 1 and Thresh 2 may be established dynamically based on user activity and/or the nature of the application 132. For instance, the thresholds may be set to lower values if the application 132 exchanges relatively little data, such that a lower level of network performance does not impair user experience. Conversely, the thresholds may be set to higher values if more bandwidth-intensive applications are being run.

FIGS. 4a-4d show various screenshots 118a-118d, which represent portions of the GUI 118 as rendered by the client component 132s of the application program 132, and as viewed on the display 116 of the client device 110. One may recognize the layout of the depicted GUIs as that of a common smartphone app; however, the GUIs 118a-118d are not limited to smartphone applications. For instance, screenshots 118a-118d may be displayed on a laptop computer or on any other computing device. The laptop may have a Wi-Fi connection and may be tethered, via Bluetooth, to a smart phone that has an LTE connection (tethering is an ability of many smart phones to share data via a PAN— Personal Area Network).

As shown in FIG. 4a, the GUI 118a displays icons 410 for currently active connection paths 180. Icons 410 for Wi-Fi and Bluetooth PAN are specifically shown, indicating that the client device 110 is connected to the Internet via both Wi-Fi and LTE (LTE connection is achieved via the Bluetooth-tethered smart phone). The GUI 118 displays a speed indicator 420, which shows network speed (in megabits per second) for both paths (0.6 Mbps for Wi-Fi and 0.1 Mbps for LTE), e.g., as measured by the sensor 144 in the link bonding client 140c.

Figure 4C:
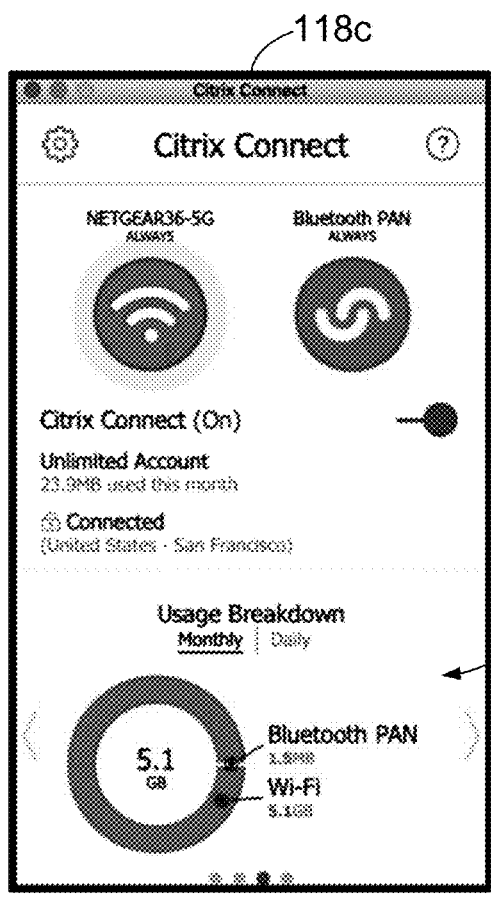
Figure 4D:
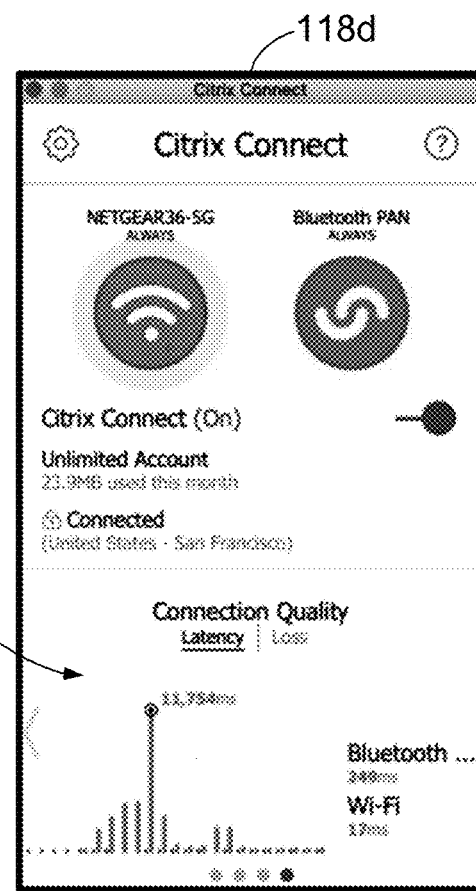

FIGS. 4b-4d show additional information, including, in FIG. 4b, statistics 430 for packets recovered (5.9 MB, the number of packets recovered by switching paths) and connections saved (2; the number of times a lost connection was avoided by switching paths). FIG. 4c shows a usage breakdown 440 (how much data from each path has been used), and FIG. 4d shows connection quality 450, in terms of both latency and loss. In some embodiments, FIGS. 4a-4d represents portions of a larger GUI 118.

Figure 5:
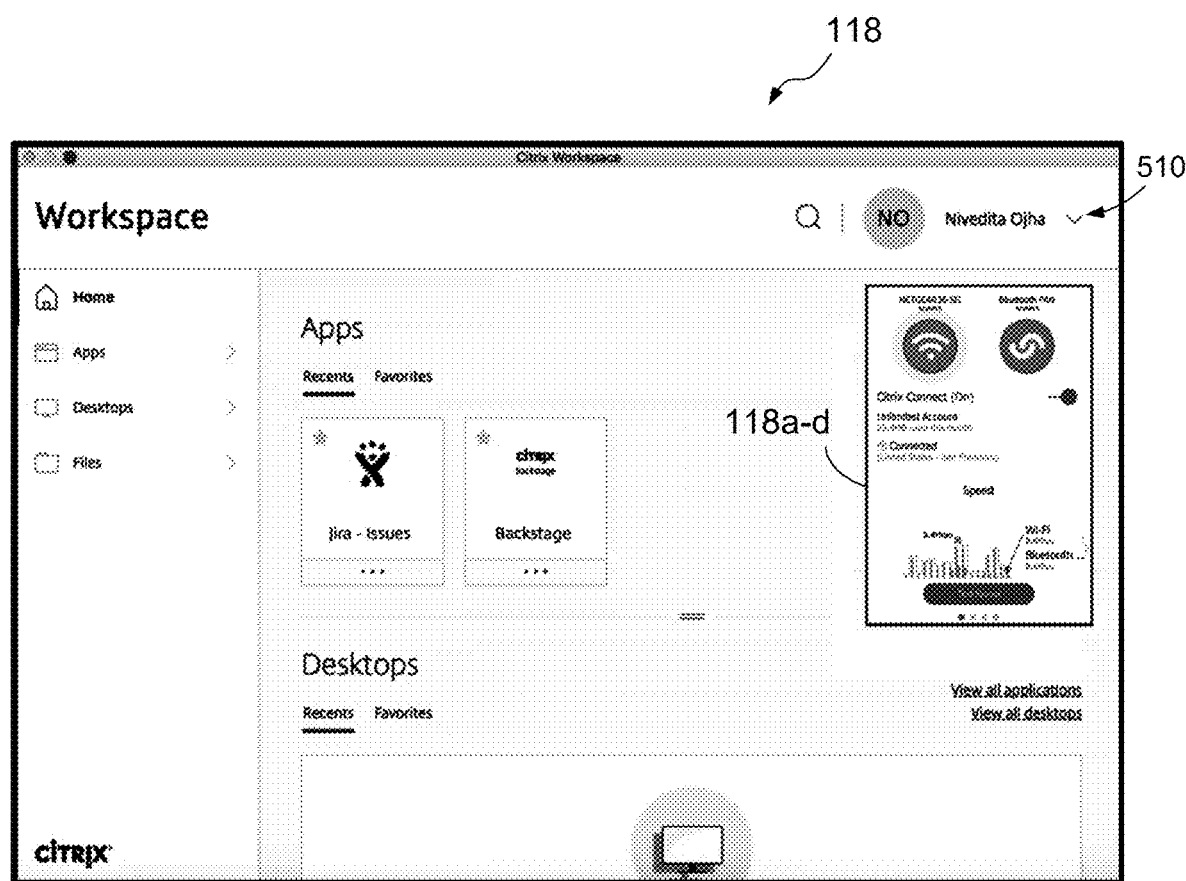
FIG. 5 is a simulated screenshot of a GUI of a SaaS workspace application.

FIG. 5 shows an example of such embodiments, in which an overall GUI 118 includes the above-described GUI portions 118a-118d. For example, user 102 may invoke the GUI portions 118a-118d by clicking an arrow 510 on the overall GUI 118. The overall GUI 118 provides a user interface for the application program 132, which in this example is a workspace framework application. The workspace framework application runs as a SaaS application, e.g., in a web browser or other container, and enables the user 102 to select and run any of its registered sub-applications. The registered sub-applications all run within the context of the application program 132, such that they all communicate via the micro-VPN client 134c and the link bonding client 140c. The depicted arrangement thus uniquely supports operation of a SaaS application over a micro-VPN using multiple paths 180, which are seamlessly switched to maintain a quality connection, even in the presence of dead spots.

Figure 6:
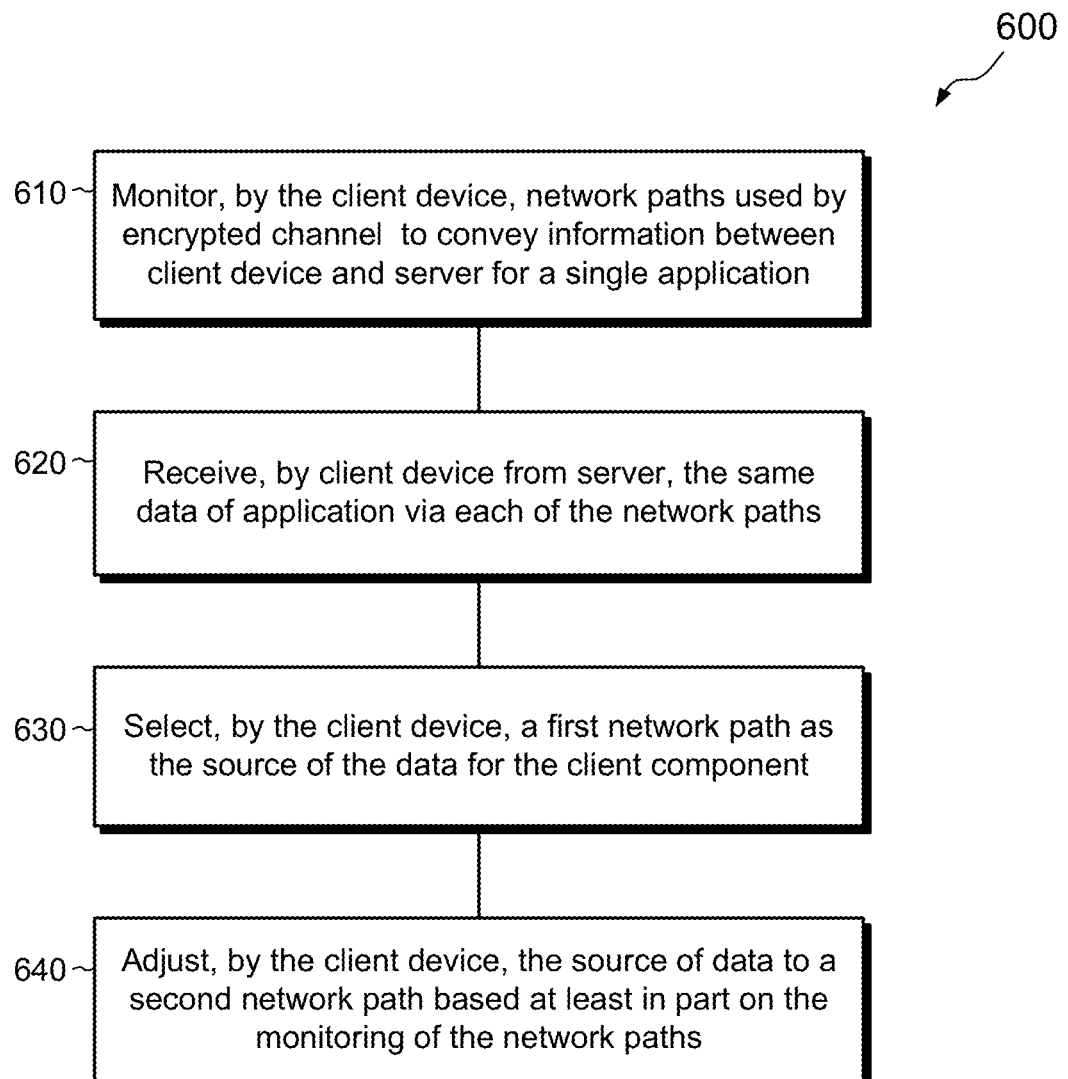
FIGS. 6-8 are flowcharts showing example methods conducted by the client device, by the server, and by a system that includes both the client device and the server.
Figure 7:
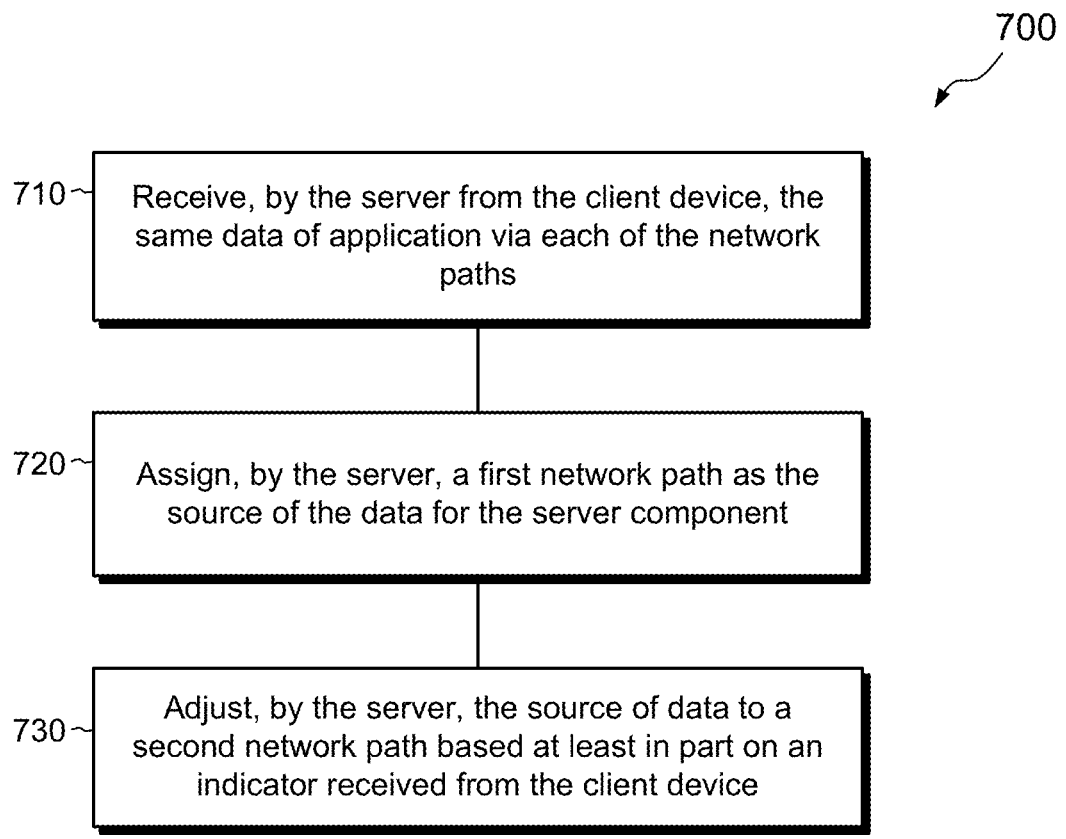
Figure 8:
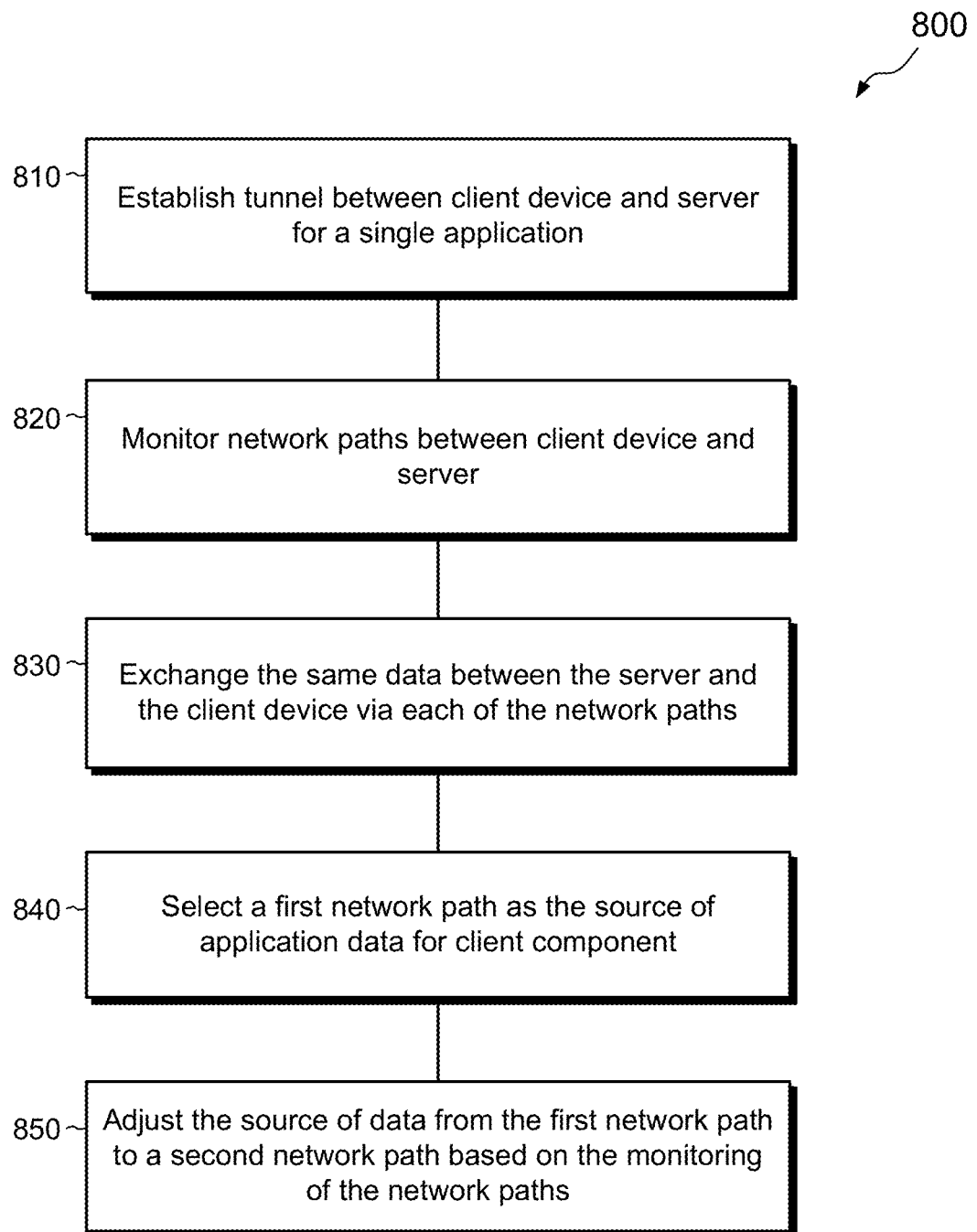

FIGS. 6-8 show example methods 600, 700, and 800 that may be carried out in connection with the environment 100. The method 600 can be performed, for example, by the software constructs described in connection with FIG. 1, which reside in the memory 130c of the client device 110 and are run by the set of processors 114c. The method 700 may be performed, for example, by the software constructs that reside in the memory 130s of the server 120 and are run by the set of processors 114s. The method 800 may be performed by the software constructs that reside in both the client device 110 and the server 120. The various acts of methods 600, 700, and 800 may be ordered in any suitable way. Accordingly, embodiments may be constructed in which acts are performed in orders different from those shown, which may include performing some acts simultaneously.

In FIG. 6, the method 600 may be performed by the client device 110. At act 610, the client device 110 monitors a plurality of network paths 180 used by an encrypted channel 134 configured to convey information between the client device 110 and a server 120 for a single application 132.

At 620, the client device 110 receives data 162 of the single application 132 from the server 120 via each of the plurality of network paths 180. The data 162 received from each of the plurality of network paths is the same data.

At 630, the client device 110 selects a first network path 144a of the plurality of network paths 180 as a source of the data 162 for a client component 132c on the client device 110. For example, the selector 142 in the link bonding client 140c passes packets arriving over the selected path 144a and discards packets arriving over other paths.

At 640, the client device 110 adjusts the source of data for the client component 132c from the first network path to a second network path of the plurality of network paths based at least in part on the monitoring of the plurality of network paths, 180 so as to prevent delay in reception of data caused by a reduction of network continuity of the first network path.

Turning now to FIG. 7, the method 700 may be performed by the server 120. At 710, the server 120 receives application data from the client device 100 over an encrypted channel 134 provided between the server 120 and the client device 110 for a single application 132. The application data 162 is received via a plurality of network paths 180 in parallel, with the plurality of network paths all conveying the same application data.

At 720, the server assigns a first network path of the plurality of network paths 180 as a source of the application data 162 for a server component 132s running on the server 120.

At 730, the server 120 adjusts the source of the application data 162 for the server component 132s from the first network path to a second network path of the plurality of network paths. The adjusting is based at least in part on an indicator received from the client device 110 and acts to prevent delay in reception of data caused by a reduction of network continuity of the first network path.

Turning now to FIG. 8, the method 800 may be performed by both the client device 110 and the server 120. At 810, an encrypted channel 134 is established between the client device 110 and the server 120. The encrypted channel 134 is configured to convey encrypted communications for a single application 132. The encrypted channel 134 may be established under direction of the client device 110, the server 120, or based on coordination between the client device 110 and the server 120.

At 820, a plurality of network paths 180 used by the encrypted channel 134 between the client device 110 and the server 120 are monitored. For example, the client 110, the server 120, and or some separate computer or facility measures network speed, bandwidth, and/or other factors pertaining to each of the plurality of network paths 180.

At 830, the server 120 transmits a set of application data 162 of the single application 132 to the client device 110 over the encrypted channel 134 via each of the plurality of network paths 180. Each of the plurality of network paths 180 conveys the same set of application data 162. When the client device 110 is the one sending the data, the client device 110 transmits a set of application data 162 of the single application 132 to the server 120 over the encrypted channel 134 via each of the plurality of network paths 180, with each of the plurality of network paths 180 conveying the same set of application data 162.

At 840, the client device 110 selects a first network path of the plurality of network paths 180 as a source of application data 162 for the client component 132c running on the client device 110. When the server 120 is the one receiving the data, the server 120 selects a first network path of the plurality of network paths 180 as a source of application data 162 for the server component 132s running on the server 120.

At 840, the client device 110 adjusts the source of data from the first network path to a second network path of the plurality of network paths based at least in part on the monitoring of the plurality of network paths, so as to prevent delay in communicating data between the client device and the server caused by a reduction of network continuity of the first path. When the server 120 is receiving the data, the server 120 adjusts the source of data from the first network path to a second network path of the plurality of network paths based at least in part on the monitoring of the plurality of network paths, so as to prevent delay in communicating data between the server and the client device caused by a reduction of network continuity of the first path.

Figure 9:
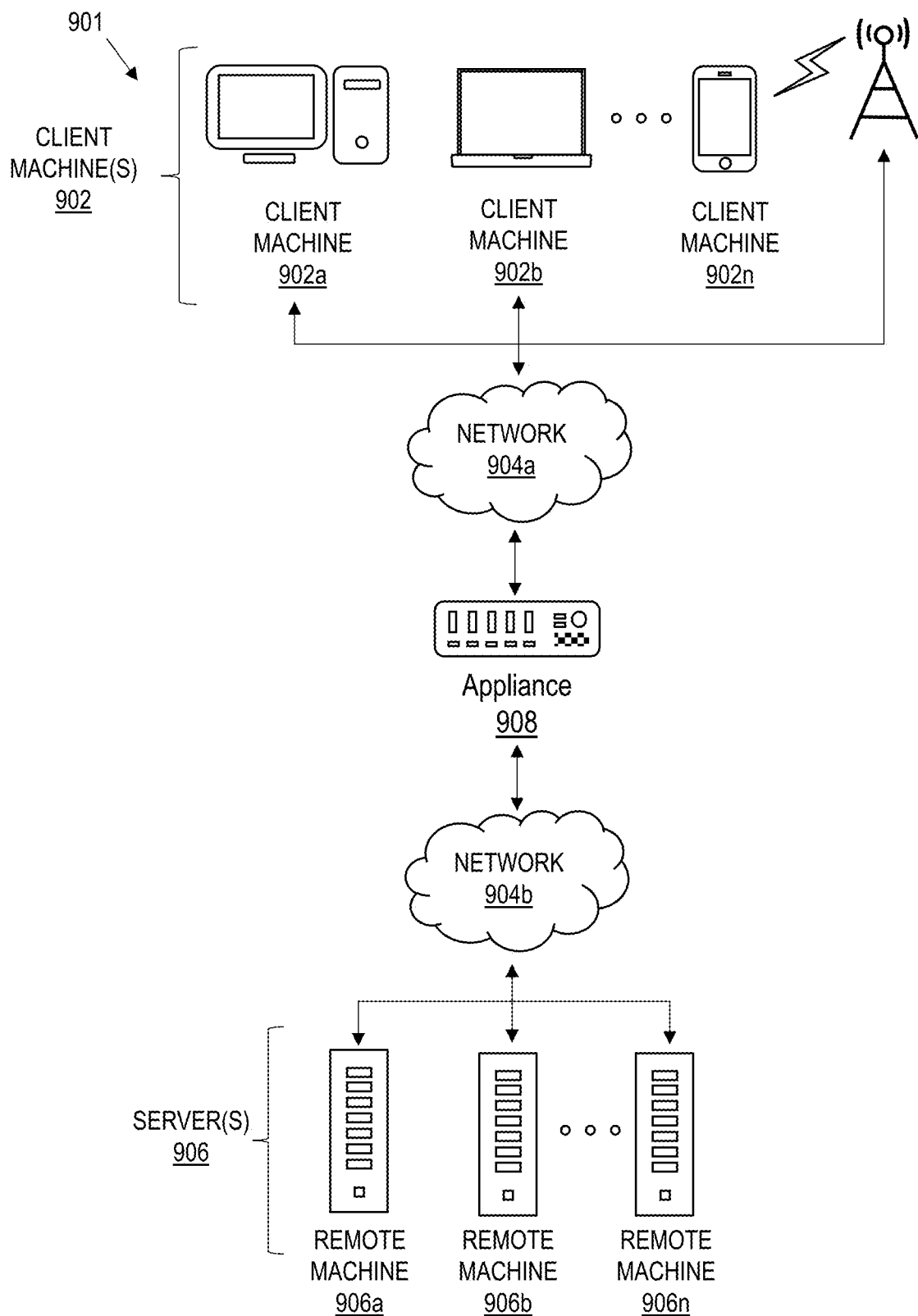
FIG. 9 is a block diagram that shows an example network environment in which various aspects of the disclosure may be implemented.

Referring now to FIG. 9, a non-limiting network environment 901 in which various aspects of the disclosure may be implemented includes one or more client machines 902A-902N, one or more remote machines 906A-906N, one or more networks 904, 904', and one or more appliances 908 installed within the computing environment 901. The client machines 902A-902N communicate with the remote machines 906A-906N via the networks 904, 904'.

In some embodiments, the client machines 902A-902N (which may be similar to client device 110) communicate with the remote machines 906A-906N (which may be similar to server 120) via an intermediary appliance 908. The illustrated appliance 908 is positioned between the networks 904, 904' and may also be referred to as a network interface or gateway. In some embodiments, the appliance 908 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 908 may be used, and the appliance(s) 908 may be deployed as part of the network 904 and/or 904'.

The client machines 902A-902N may be generally referred to as client machines 902, local machines 902, clients 902, client nodes 902, client computers 902, client devices 902, computing devices 902, endpoints 902, or endpoint nodes 902. The remote machines 906A-906N may be generally referred to as servers 906 or a server farm 906. In some embodiments, a client device 902 may have the capacity to function as both a client node seeking access to resources provided by a server 906 and as a server 906 providing access to hosted resources for other client devices 902A-902N. The networks 904, 904' may be generally referred to as a network 904. The networks 904 may be configured in any combination of wired and wireless networks.

A server 906 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 906 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 906 may execute a remote presentation services program or other program that uses a thin-client or a remote-display protocol to capture display output generated by an application executing on a server 906 and transmit the application display output to a client device 902.

In yet other embodiments, a server 906 may execute a virtual machine providing, to a user of a client device 902, access to a computing environment. The client device 902 may be a virtual machine. The virtual machine may be managed by, for example, a hypervisor, a virtual machine manager (VMM), or any other hardware virtualization technique within the server 906.

In some embodiments, the network 904 may be: a local-area network (LAN); a metropolitan area network (MAN); a wide area network (WAN); a primary public network 904; and a primary private network 904. Additional embodiments may include a network 904 of mobile telephone networks that use various protocols to communicate among mobile devices. For short range communications within a wireless local-area network (WLAN), the protocols may include 802.11, Bluetooth, and Near Field Communication (NFC).

Figure 10:
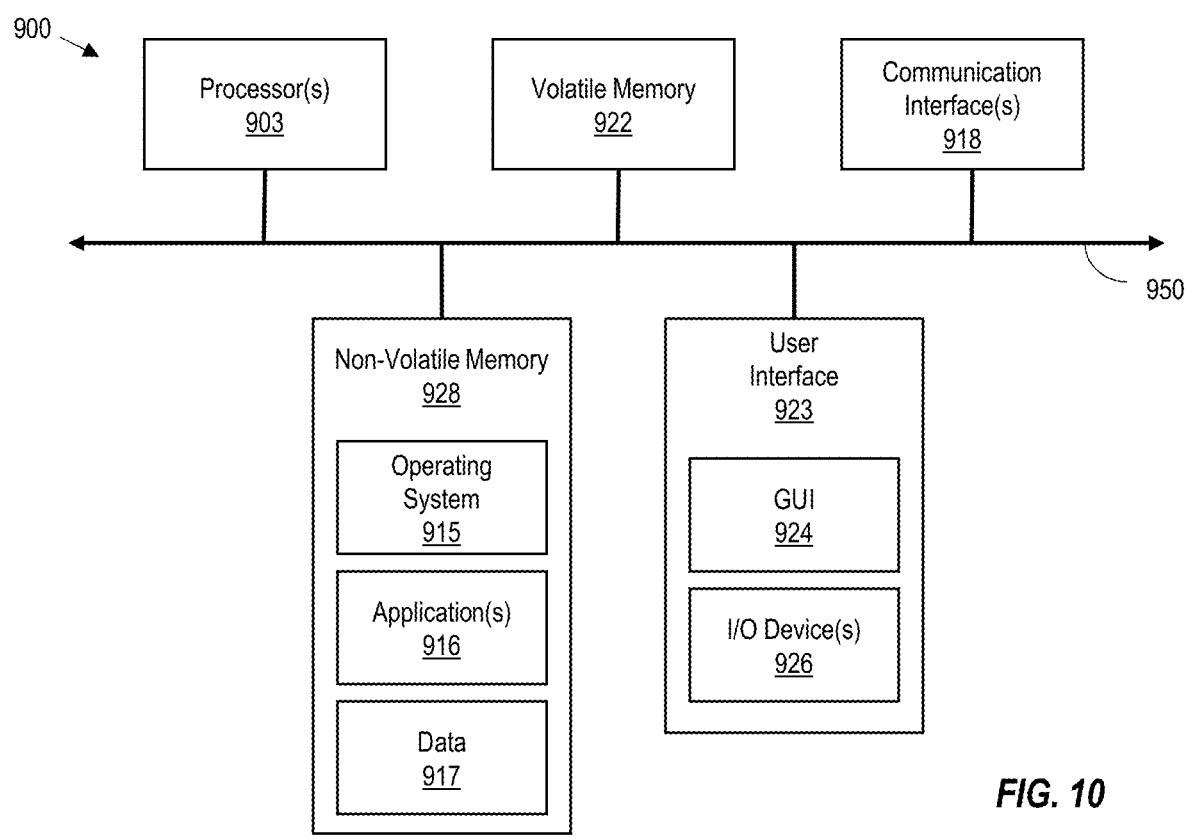
FIG. 10 is a block diagram that shows a computing device useful for practicing an embodiment of client devices, appliances and/or servers.

FIG. 10 depicts a block diagram of a computing device 900 useful for practicing an embodiment of client devices 902, appliances 908 and/or servers 906. The computing device 900 includes one or more processors 903, volatile memory 922 (e.g., random access memory (RAM)), non-volatile memory 928, user interface (UI) 923, one or more communications interfaces 918, and a communications bus 950.

The non-volatile memory 928 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 923 may include a graphical user interface (GUI) 924 (e.g., a touchscreen, a display, etc.) and one or more input/output (I/O) devices 926 (e.g., a mouse, a keyboard, a microphone, one or more speakers, one or more cameras, one or more biometric scanners, one or more environmental sensors, and one or more accelerometers, etc.).

The non-volatile memory 928 stores an operating system 915, one or more applications 916, and data 917 such that, for example, computer instructions of the operating system 915 and/or the applications 916 are executed by processor(s) 903 out of the volatile memory 922. In some embodiments, the volatile memory 922 may include one or more types of RAM and/or a cache memory that may offer a faster response time than a main memory. Data may be entered using an input device of the GUI 924 or received from the I/O device(s) 926. Various elements of the computer 900 may communicate via the communications bus 950.

The illustrated computing device 900 is shown merely as an example client device or server, and may be implemented by any computing or processing environment with any type of machine or set of machines that may have suitable hardware and/or software capable of operating as described herein.

The processor(s) 903 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 903 may be analog, digital or mixed-signal. In some embodiments, the processor 903 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 918 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 900 may execute an application on behalf of a user of a client device. For example, the computing device 900 may execute one or more virtual machines managed by a hypervisor. Each virtual machine may provide an execution session within which applications execute on behalf of a user or a client device, such as a hosted desktop session. The computing device 900 may also execute a terminal services session to provide a hosted desktop environment. The computing device 900 may provide access to a remote computing environment including one or more applications, one or more desktop applications, and one or more desktop sessions in which one or more applications may execute.

A technique has been described for managing communication over a network 170. The technique maintains multiple network paths 180 simultaneously, exchanging the same data 162 redundantly through all network paths 180 and allowing a receiver (e.g., selector 142) to select one of the network paths 180 as its source of data. In the event that a first, currently-selected network path, such as Wi-Fi, becomes weak, the receiver 142 automatically and seamlessly switches its source of data to a second network path, such as LTE, while the first network path remains operational. Given that the second (LTE) network path is already on and is already conveying data, the transition is nearly instantaneous. User experience is greatly improved, as even highly interactive applications running in environments with inconsistent networks can remain fully functional with generally no downtime. Reliability and user experience are thereby enhanced.

The following paragraphs describe example implementations of methods, systems, and computer-readable media in accordance with the present disclosure.

According to some examples, a method includes monitoring, by a client device, a plurality of network paths that convey data between the client device and a server, the data being associated with a single application on the server. The method further includes receiving, by the client device, the data from the server via each of the plurality of network paths, the data received from each of the plurality of network paths being the same. The method still further includes selecting, by the client device, a first network path of the plurality of network paths from which to receive data to enable delivery of the single application on the server to the client device, and adjusting, by the client device, the selected network path from the first network path to a second network path of the plurality of network paths based at least in part on the monitoring of the plurality of network paths, so as to prevent delay in receipt of data from the server caused by a reduction of network continuity of the first network path.

Section II: Authenticating to Secured Resource Via Coupled Devices

An improved technique for performing authentication by a first device increases authentication strength and/or convenience based at least in part on security data received from a second device that shares its network connection with the first device. The technique described in this section may be provided in the environment of Section I, e.g., in an arrangement in which a device maintains multiple, simultaneous network connections and seamlessly switches between or among them. The Section-I arrangement is not required, however, as the technique presented in this section may be used independently of the one presented in Section I.

Figure 11:
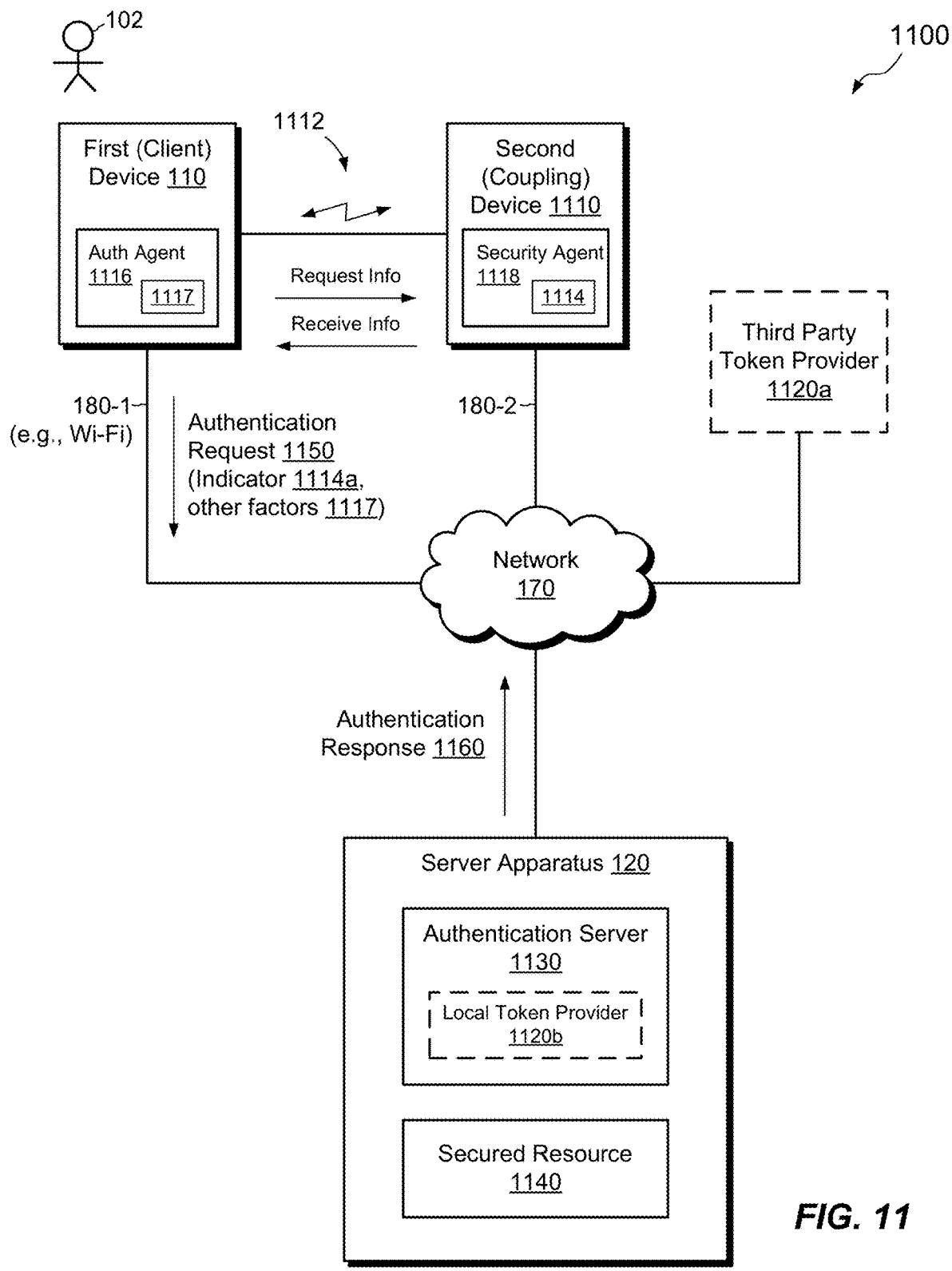
FIG. 11 is a block diagram of an example system in which embodiments for performing authentication can be practiced.

FIG. 11 shows an example system 1100 in which embodiments of the improved technique can be practiced. Here, a first (client) device 110, a second (coupling) device 1110, and a server 120 operatively connect to a network 170. The first device 110, server 120, and network 170 may be similar to those described in connection with FIG. 1, though this is not required. Also, the first device 110 and the second device 1110 may be owned and operated by the same person or entity, although this is also not required.

The first device 110 connects to the network 170 via a first network path 180-1, and the second device 1110 connects to the network 170 via a second network path 180-2. For example, the first network path 180-1 may be Wi-Fi (IEEE 802.11X) and the second network path 180-2 may be cellular data, such as LTE (Long Term Evolution), GSM (Global System for Mobile), CDMA (Code Division Multiple Access), or WiMAX. The second network path 180-2 may also be 5G or some other developing or future cellular scheme. The first device 110 may be a laptop, tablet, or other computer, and the second device 1110 may be a smartphone, tablet, dongle, personal reader, or other device having a cellular data interface. Although devices 110 and 1110 are both shown as having a single path 180-1 or 180-2 to the network 170, one should appreciate that each device may have multiple paths to the network 170. For example, the first device 110 may have an Ethernet and/or cellular interface in addition to Wi-Fi, and the second device 1110 may have an Ethernet and/or Wi-Fi interface in addition to cellular. The network 170 may be provided as a local area network (LAN), a wide area network (WAN), an intranet, the Internet, and/or some other type of network or combination of networks. In a particular example, the network 170 includes the Internet, and the server 120 is a provider of cloud-based and/or virtual services, such as SaaS (Software as a Service) applications and/or file storage. In an example, the first device 110 and the second device 1110 are both registered with the server 120. For example, the devices have a code or other data element that uniquely identifies the respective devices to the server 120.

In the manner shown, the first device 110 is configured to access the second network path 180-2 via the second device 1110, for example by tethering or otherwise communicatively coupling the devices. "Tethering" describes the sharing of a mobile device's network connection with other computers. By communicatively coupling to the second device 1110, the first device 110 is able to maintain multiple, simultaneous connection paths to the network 170, and thus to the server 120. If connection path 180-1 becomes weak, the client device 110 may seamlessly and transparently switch to connection path 180-2, or vice-versa, with little or no disruption. Coupling of the first device 110 by the second device 1110 may be achieved over a connection medium 1112, such as Bluetooth, Wi-Fi, USB (Universal Serial Bus), or some other protocol or type of cable.

In example operation, the user 102 configures the second device 1110 to share (e.g., tether) its network path 180-2 with the first device 110. For example, if the second device 1110 runs Apple iOS, the user 102 may go into Settings on the second device 1110, select Cellular settings, and operate the controls to set up a Personal Hotspot. The second device 1110 may then give the user a choice to connect to the first computer 110 using Wi-Fi, Bluetooth, or USB. Similar procedures are available on devices running Android OS, Chrome OS, Windows Phone, and other mobile operating systems.

With the second device 1110 configured to share the second network path 180-2, the first device 110 discovers and connects to the second network path 180-2, such that the first device 110 can access the network 170 via both the first network path 180-1 and the second network path 180-2.

In some examples, upon discovering the second network path 180-2, the first device 110 initiates a handshaking protocol with the second device 1110 to obtain security data 1114 from a security agent 1118 on the second device 1110. The security data 1114 may take various forms, such as a security token, information that identifies the second device 1110, or any other form. During initial handshaking, for example, the first device 110 obtains the security data 1114 and keeps it available for future use. Although handshaking is advantageously performed upon discovering the second network path 180-2, this is merely an example, as handshaking may be performed at any time, including in response to an express request by the user 102.

At some point, the user 102 may wish to operate the first device 110 to access a secured resource 1140 on the server 120, such as a secured SaaS application, a secured file, or some other resource on the server 120 that requires authentication. The secured resource 1140 may be accessible solely by the user 102, or it may be accessible to multiple authenticated users, e.g., based on respective authorization settings. To access the resource, the user 102 may start a browser or client-side application on the first device 110. The browser or client-side application displays an authentication page, which requests authentication factors from the user 102, such as a password, token, biometric input, and/or the like. The user fills out the authentication page and submits the page to the server 120.

In accordance with particular improvements hereof, the security data 1114, which was received from the second device 1110, provides a basis for improving authentication strength and/or convenience when accessing the secured resource 1140. For example, the security data 1114 may include identifying information about the second device 1110, such as a registration code of the second device 1110 (e.g., one previously obtained from the server 120 by the security agent 1118). Based on the received security data, an authentication agent 1116 running on the first device 110 generates an indicator 1114a and provides the indicator 1114a as part of an authentication request 1150, which may be submitted to the server 120, e.g., along with one or more other authentication factors 1117, such as a password, biometric input, etc. The indicator 1114a may be the same as the security data 1114 or otherwise may be based on the security data 1114. In some examples, the indicator 1114a is hidden, such that the user 102 never sees or handles the indicator 1114a. Rather, the indicator 1114a may be included with the authentication request 1150 automatically, e.g., as a hidden authentication factor.

When the first device 110 submits the authentication request 1150 to the server 120, an authentication server 1130 receives the request 1150 and attempts to validate the received information. For example, the authentication server 1130 performs an authentication operation that compares provided authentication factors 1114a and 1117 with expected values for those factors, producing an authentication result 1160. The result 1160 is successful if the actual and expected values match and unsuccessful if the values do not match. As part of the authentication operation, the authentication server 1130 compares the indicator 1114a to an expected value thereof and bases the authentication result 1160 at least in part on whether the indicator 1114a matches its expected value. If authentication succeeds, the authentication server 1130 may allow the first device 110 to access the secured resource 1140. Otherwise, the authentication server 1130 may deny such access or challenge the user 102 to supply additional authentication factors.

Although the authentication server 1130 is considered to be part of the server 120, there is no need for the authentication server 1130 to be located on the same physical computer. Rather, as in Section I, the server 120 may be implemented using any number of physical computers and/or virtual machines, which are collectively referred to herein as "the server."

In some examples, the security agent 1118 generates the security data 1114 or a portion thereof as a token code and the token code provides an additional authentication factor for the authentication request 1150. For example, the security agent 1118 on the second device 1110 may be synchronized with a third party token provider 1120a, such as Symantec VIP. The security agent 1118 and token provider 1120a may each generate token codes from a common seed, such that both are able to generate the same token codes at the same times. The authentication server 130 may validate a token code received in an authentication request 1150 by obtaining a current code from the third party token provider 1120a and comparing the received code with the current code. In some examples, the authentication server 130 itself runs a local token provider 1120b, which performs a similar role as the third party token provider 1120a but runs locally on the server 120.

In the manner described, the first device 110 leverages the second device 1110 to which the first device 110 is coupled to assist with authentication to the secured resource 1140. Thus, not only does the second device 1110 share its network path 180-2 for enhancing reliability, but also it supplies security data 1114 for enhancing authentication.

Figure 12:
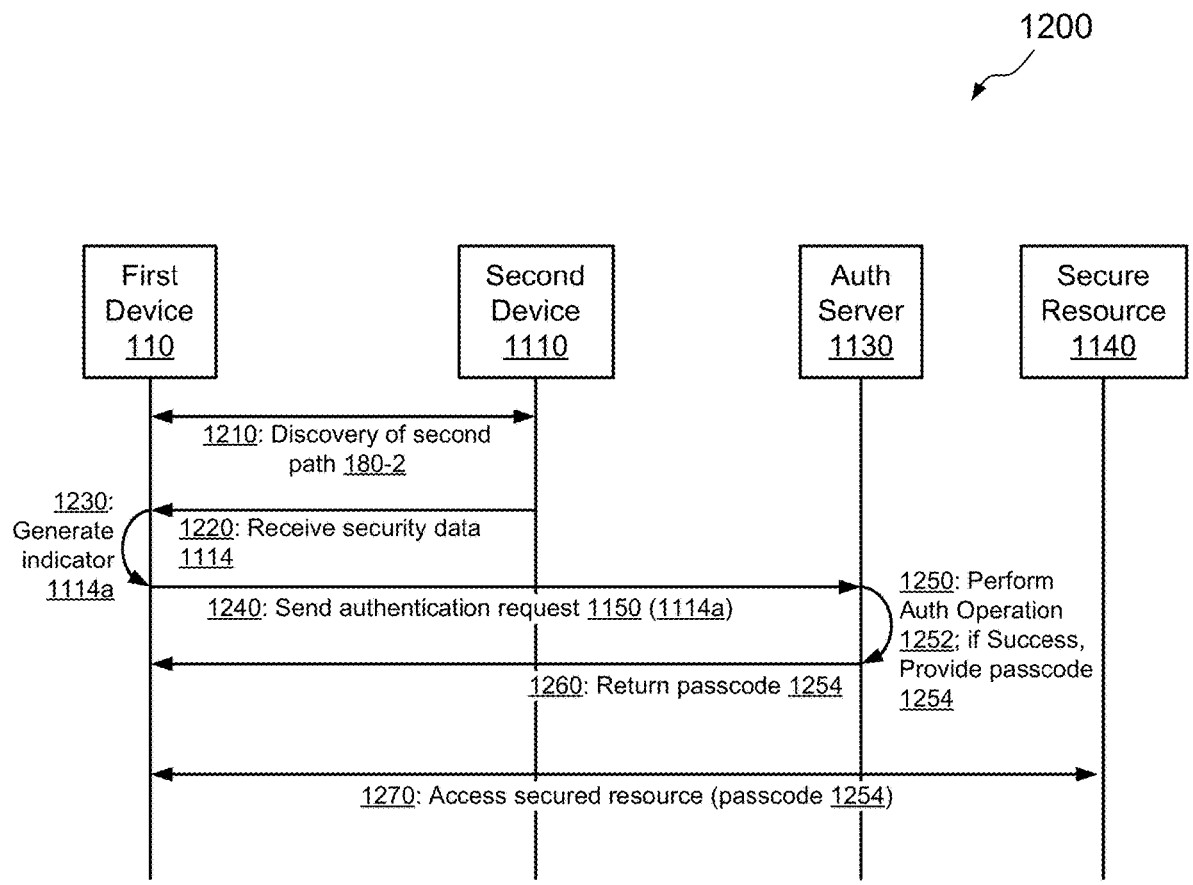
FIG. 12 is a sequence diagram showing an example procedure for performing authentication by a first device based at least in part on security data received from a second device.

FIG. 12 shows an example arrangement 1200 in which the presence of the second device 1110 communicatively coupled to the first device 110 serves as an authentication factor for authentication requests 1150. The illustrated activities may involve the first device 110, second device 1110, authentication server 1130, and secured resource 1140.

At 1210, the first device 110 discovers the second network path 180-2 upon becoming communicatively coupled to the second device 1110. For example, the user 102 configures the second device 1110 as a personal hotspot and establishes a connection between the first device 110 and the second device 1110, e.g., via Wi-Fi, Bluetooth, or USB. The first device 110 discovers the second network path 180-2 and establishes a connection to the network 170 through the second path.

At 1220, the first device 110 receives security data 1114 from the second device 1110. In this example, the security data 1114 may include an identifier of the second device 1110, e.g., a registration code or other shared secret created or allocated to uniquely identify the second device 1110 from among other devices. For example, the server 120 may have previously created the registration code specifically for the second device 1110 as part of a registration process for registering the second device 1110 to the server 120. The registration code identifies the second device 110 as a known device, to which the server 120 may accord some level of trust.

At 1230, the first device 110 generates an indicator 1114a from the security data 1114. The indicator 1114a may be identical to the security data 1114 or may be otherwise based on the security data 1114. For example, the indicator 1114a may be provided as an encrypted version of the registration code or as a result of running an algorithm on the registration code. In some examples, the indicator 1114a includes additional information, such as a code that specifies that the first device 110 is currently tethered or otherwise communicatively coupled to the second device 1110.

At 1240, the first device sends an authentication request 1150 to the authentication server 1130. The authentication request 1150 includes the indicator 1114a, which may be provided as a hidden authentication factor. In some examples, the authentication request 1150 also includes one or more additional authentication factors 1117, such as a password, a thumbprint, or the like. The first device 110 may add these additional authentication factors 1117 to the authentication request 1150.

At 1250, the authentication server 1130 receives the authentication request 1150 and performs an authentication operation 1252. In an example, the authentication operation 1252 verifies the received authentication factors (or some subset thereof) and produces a successful result or an unsuccessful result. In response to generating a successful result, the authentication operation 1252 may generate a passcode 1254, which acts as a key for unlocking the secured resource 1140. One should appreciate that the authentication request 1150 typically specifies multiple authentication factors (e.g., 1114a and 1117), of which only a subset 1114a are normally provided by the second device 1110. Thus, a malicious user would normally be unable to successfully authenticate by stealing an authorized user's phone (or other device) and trying to log on, as the malicious user would be unable to enter other factors 1117 that are required for authentication to succeed.

At 1260, the authentication server 1130 returns the passcode 1254 to the first device 110, e.g., as part of an authentication response 1160.

At 1270, the first device 110 uses the passcode 1254 to access the secured resource 1140, e.g., to run a secured SaaS application or to access a secured file.

The arrangement 1200 thus leverages the previously-established knowledge of the second device 1110 to improve authentication strength and/or convenience of authentication requests 1150 made by the first device 110. In some situations, the indicator 1114a may be one of multiple silent authentication factors or may be used alone to produce successful authentication, such that the user 102 need not manually enter any authentication factors. In such cases, the user 102 may access the secured resource 1140 merely by requesting such access, without having to do anything extra for purposes of authentication.

Figure 13:
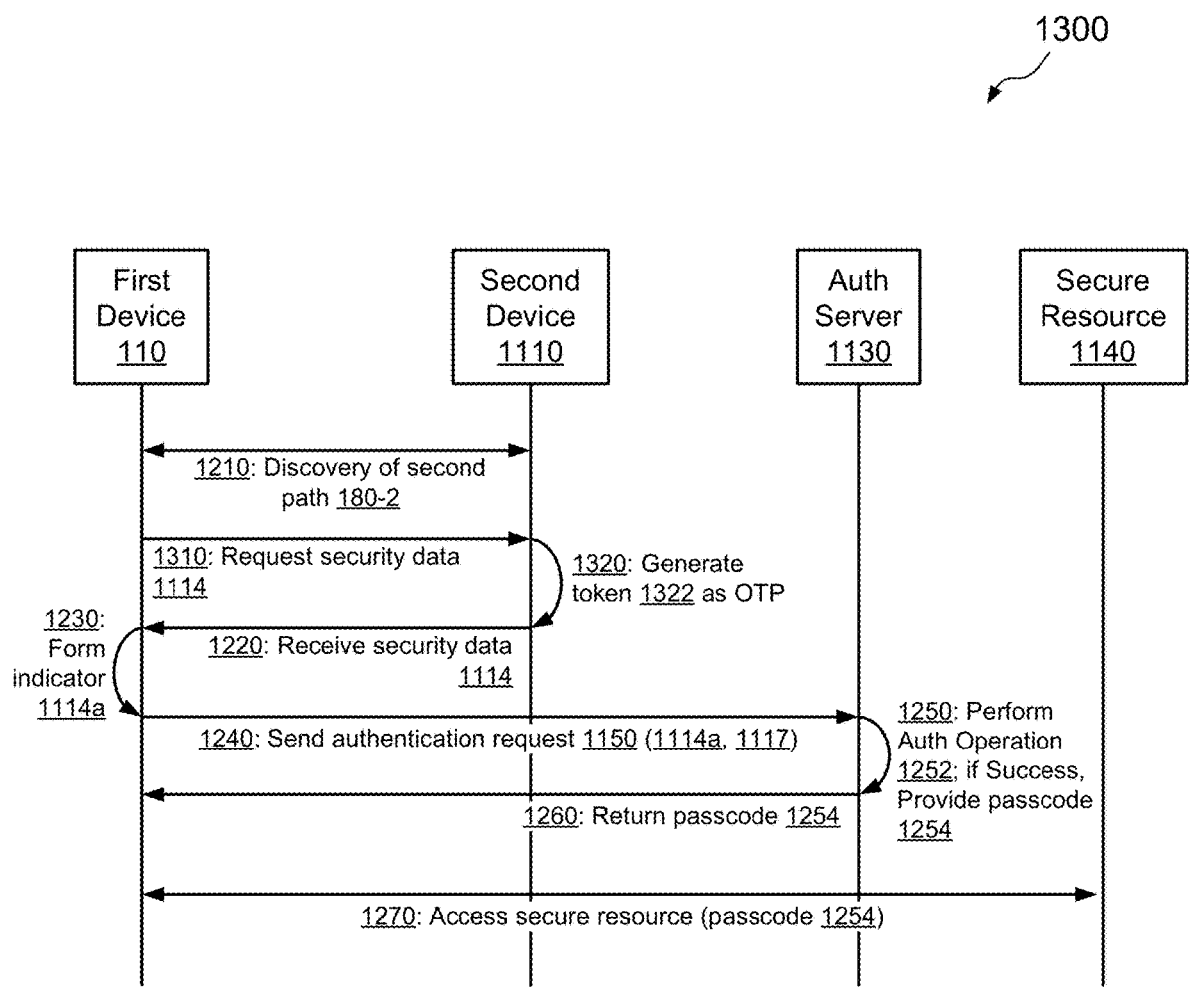
FIG. 13 is a sequence diagram showing another example procedure for performing authentication by a first device based at least in part on security data received from a second device.

FIG. 13 shows an example arrangement 1300 in which the second device 1110 provides a security token automatically to the first device 110 for providing an additional authentication factor. As in FIG. 12, the illustrated arrangement may involve the first device 110, second device 1110, authentication server 1130, and secured resource 1140.

The flow in FIG. 13 may start at 1210, the same way as in FIG. 12, with the first device 110 discovering the second network path 180-2 upon being communicatively coupled to the second device 1110.

Operation differs from that of FIG. 12 at 1310, however, in that the first device 110 requests security data 1114 from the second device 1110. The request may be issued at the direction of the user 102 or may automatically. At 1320, in response to the request at 1310, the second device 1110 generates a new security token 1322, e.g., by operation of the security agent 1118. The new security token 1322 may be a one-time password or other type of token, which is known to a token provider 1120a or 1120b or can be computed by a token provider. At 1220, the second device 1110 returns the new token 1322 to the first device 110.

The ensuing activities may be similar to those shown in FIG. 12, with like reference numerals indicating similar acts. Here, however, the authentication operation 1252 may additionally involve contacting the token provider 1120a or 1120b to verify the security token 1322.

The arrangement of FIG. 13 thus allows a token code 1322 to be conveyed automatically to the first device 110, without requiring the user 102 to manually transfer the token code 1322 from the second device 1110 to the first device 110. The token code 1322 can thus provide an additional authentication factor without requiring additional manual activity on the part of the user 102. As in FIG. 12, the entire authentication process can be made transparent to the user 102, as it may be performed automatically without user involvement.

Although the activities of FIGS. 12 and 13 are shown as alternatives, they may alternatively be used together. For example, act 1220 of receiving the security data 1114 may return both a token code 1322, as in FIG. 13, and a registration code of the second device 1110 or other shared secret, as in FIG. 12. Both elements may then be included in the indicator 1114a, which may be sent to the server 120 as part of the authentication request 1150. The disclosed arrangement thus seamlessly provides two authentication factors automatically, e.g., one for the known second device 1110 and another for the token code 1322.

Figure 14:
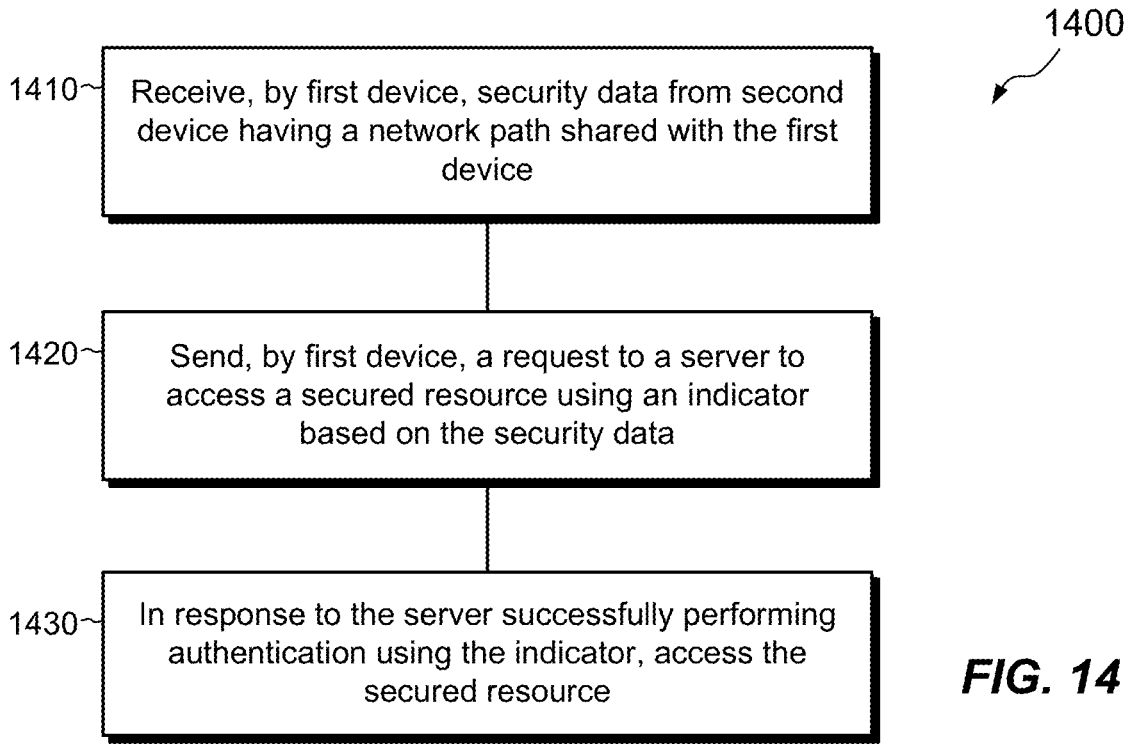
FIG. 14 is a flowchart showing an example method conducted by a client device for participating in authentication.
Figure 15:
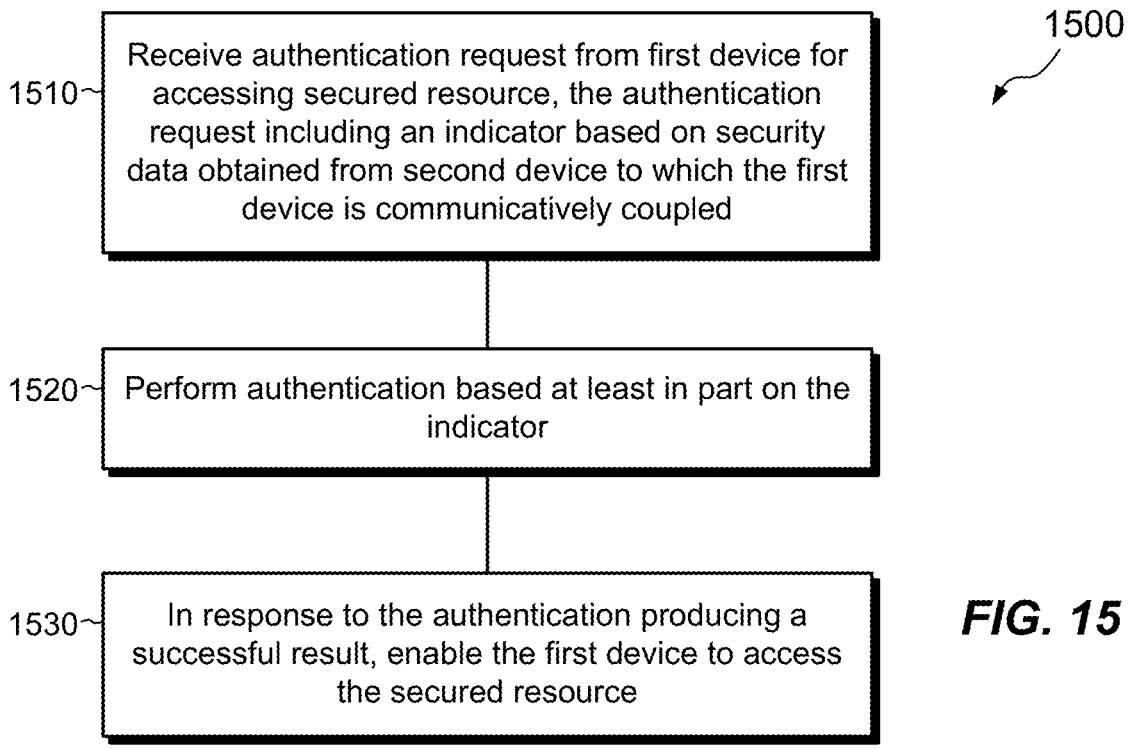
FIG. 15 is a flowchart showing an example method conducted by a server for participating in authentication.

FIGS. 14 and 15 show example methods 1400 and 1500 that may be carried out in connection with the environment 1100. The methods 1400 and 1500 are respectively presented from the client and server perspectives.

In FIG. 14, operation begins at 1410, whereupon the first device 110 receives security data 1114 from the second device 1110. The second device 1110 has a network path 180-2, such as a cellular data path, shared with the first device 110. The first device 110 may have its own network path 180-1, such as Wi-Fi. The security data 1114 may include identity information about the second device 1110, such as a registration code or other shared secret, and/or may include a token code 1322, such as a one-time password.

At 1420, the first device 110 sends a request to the server 120 to access a secured resource 1140 using an indicator 1114a based on the security data 1114. For example, the secured resource 1140 is a secured SaaS application, a secured file, or some other resource. The indicator 1114a may be identical to the received security data 1114 or it may be based upon such security data 1114. The request may also include additional authentication factors 1117.

At 1430, the first device 110 accesses the secured resource 1140 in response to successful authentication based at least in part on the identifier 1114a. For example, successful authentication may result from verification that the second device 1110 coupled to the first device 110 and is known to (e.g., registered with or otherwise trusted by) the server 120, and/or that a token code 1322 provided in an authentication request 1150 matches an expected token code.

Turning now to FIG. 15, operation begins at 1510, whereupon the server 120 receives an authentication request 1150 from the first device 110 for accessing the secured resource 1140. The received authentication request 1140 includes an indicator 1114a based on security data 1114 obtained from the second device 1110, which shares its network connection to the first device 110. The indicator 1114a may include, for example, an identifier of the second device 1110, such as a registration code or other shared secret, and/or a one-time password generated by the second device 1110.

At 1520, the server 120, e.g., acting through the authentication server 1130, performs an authentication operation 1252 based at least in part on the received indicator 1114a. For example, the authentication operation 1252 verifies, based on the registration code, that the second device 1110 is known to the server 120, and/or verifies that the token code 1322 matches an expected value.

At 1530, the server 120 enables the first device 110 to access the secured resource 1140 in response to the authentication operation 1252 producing a successful result. For example, the server 120 may generate a passcode 1254 that the first device 110 may use as a key for accessing the secured resource 1140.

An improved technique has been described for performing authentication. The technique increases authentication strength and/or convenience by receiving security data 1114 from a second device 1100 that shares its network connection 180-2 with a first device 110. In cases where the first device 110 uses the network connection 180-2 of the second device 1100 to maintain multiple simultaneous network connections 180, the second device 1100 can provide increased authentication strength with little or no additional effort on the part of a user. Rather, in some examples the second device 1100 can transparently add authentication strength to authentication requests 1152 made by the first device 110 with little or no user involvement The following paragraphs (M1) through (M9) describe examples of methods that may be implemented in accordance with the present disclosure:

(M1) A method has been described that includes receiving, by a first device having a first connection to a computer network, security data from a second device having a second connection to the computer network and sharing the second connection with the first device, the security data indicating a trusted relationship previously established between the second device and a server. The method further includes sending, by the first device, a request to the server to access a secured resource on the computer network, the request including an indicator based on the received security data from the second device and directing the server to perform authentication based at least in part on the indicator. In response to authentication of the request based at least in part on the security data received from the second device, the method further includes accessing the secured resource by the first device.

(M2) A method may be performed as described in paragraph (M1), and may further involve providing the indicator as an authentication factor.

(M3) Another method may be performed as described in any one of paragraphs (M1) through (M2), and further involves establishing the first connection to the computer network as a Wi-Fi connection, and establishing the second connection to the computer network as a cellular data connection. According to some variants, the cellular data connection is established as an LTE (Long Term Evolution) connection.

(M4) Another method may be performed as described in any one of paragraphs (M1) through (M3), and may further involve the first device sharing the second connection with the second device via one of (i) Bluetooth, (ii) Wi-Fi, or (iii) a cable.

(M5) Another method may be performed as described in any one of paragraphs (M1) through (M4), wherein accessing the secured resource includes the first device communicating with the secured resource via the second connection.

(M6) Another method may be performed as described in any one of paragraphs (M1) through (M5), and may further involve the indicator including a representation of an identity of the second device.

(M7) Another method may be performed as described in any one of paragraphs (M1) through (M6), and may further involve the indicator including a secure token generated or acquired by the second device, wherein directing the server to perform authentication includes providing the secure token to the server as an authentication factor.

(M8) Another method may be performed as described in any one of paragraphs (M1) through (M7), wherein accessing the secured resource may further involve the first device communicating with the secured resource via the first connection and, in response to a reduction in signal strength through the first connection, the first device communicating with the secured resource via the second connection.

(M9) Another method may be performed as described in any one of paragraphs (M1) through (M8), and may further involve receiving the security data from the second device in response to the first device becoming communicatively coupled to the second device.

The following paragraphs (D1) through (D4) describe examples of devices that may be implemented in accordance with the present disclosure:

(D1) A computerized device may include a first connection to a computer network and control circuitry constructed and arranged to: receive security data from a second device having a second connection to the computer network and sharing the second connection with the computerized device, the security data indicating a trusted relationship previously established between the second device and a server; send a request to the server to access a secured resource on the computer network, the request including an indicator based on the received security data from the second device and directing the server to perform authentication based at least in part on the indicator; and in response to authentication of the request based at least in part on the security data received from the second device, access the secured resource.

(D2) Another computerized device may be provided as described in paragraph (D1), and may further involve the first connection to the computer network being a Wi-Fi connection, the second connection to the computer network being a cellular data connection, and the computerized device sharing the second connection with the second device via one of (i) Bluetooth, (ii) Wi-Fi, or (iii) a cable.

(D3) Another computerized system may be provided as described in any one of paragraphs (D1) through (D2), and may further involve the indicator including a representation of an identity of the second device.

(D4) Another computerized system may be provided as described in any one of paragraphs (D1) through (D3), and may further involve the indicator including a secure token generated or acquired by the second device.

In addition, the following paragraphs (MM1) through (MM5) describe examples of methods that may be implemented in accordance with the present disclosure:

(MM1) A method may include receiving an authentication request from a first device for accessing a secured resource, the authentication request including an indicator based on security data obtained by the first device from a second device to which the first device is coupled for providing a network connection. In response to receiving the authentication request, the method may further include performing authentication based at least in part on the indicator. In response authentication of the request, the method may still further include providing the first device with access to the secured resource.

(MM2) Another method may be provided as described in paragraph (MM1), and may further involve, when performing the authentication, providing the indicator as an authentication factor.

(MM3) Another method may be provided as described in any one of paragraphs (MM1 through (MM2), and may further involve providing the indicator as a representation of an identity of the second device.

(MM4) Another method may be provided as described in any one of paragraphs (MM1 through (MM3), and may further involve (i) validating the identity of the second device and (ii) confirming that the first device is communicatively coupled to the second device.

(MM5) Another method may be provided as described in any one of paragraphs (MM1 through (MM4) and may further involve the indicator including a secure token generated by or acquired by the second device, wherein performing authentication includes using the secure token as an authentication factor.

In addition, the following paragraphs (DD1) through (DD4) describe examples of a device that may be implemented in accordance with the present disclosure:

(DD1) A server apparatus may include control circuitry constructed and arranged to: receive an authentication request from a first device for accessing a secured resource, the authentication request including an indicator based on security data obtained by the first device from a second device to which the first device is coupled for providing a network connection; in response to receipt of the authentication request, perform authentication based at least in part on the indicator; and in response to authentication of the request, provide the first device with access to the secured resource.

(DD2) Another server apparatus may be provided as described in paragraph (DD1) wherein performing authentication includes (i) validating the identity of the second device and (ii) confirming that the first device is communicatively coupled to the second device.

(DD3) Another server apparatus may be provided as described in any one of paragraphs (DD1) through (DD2) and may further involve the indicator including a secure token generated or acquired by the second device, wherein performing authentication includes using the secure token as an authentication factor.

(DD4) Another server apparatus may be provided as described in any one of paragraphs (DD1) through (DD3) wherein performing authentication includes verifying the indicator as well as a set of additional authentication factors received from the first device.

Having described certain embodiments, numerous alternative embodiments or variations can be made. For example, although the second device 1110 has been described herein as providing registration codes and/or token codes to enhance authentication strength, embodiments are not limited to these particular types of security data. For example, any shared secret known to both the second device 1110 and the server 120 may suffice, as any such secret may serve as a basis for improving authentication strength and/or convenience.

Further, although embodiments have been described wherein the authentication server 1130 provides a passcode 1254 that the first device 110 may use as a key for unlocking the secured resource 1140, this is merely an example. For instance, other mechanisms may be used to provide secure access to authenticated users, such as SAML (Security Assertion Markup Language).

Further still, although embodiments have been described in which the second device 1110 provides a second connection to the computer network, e.g., to support multiple redundant network paths, this is also merely an example. Alternatively, the second device 1110 is used to assist with authentication but does not require a second connection to the network.

Further, although embodiments have been described in connection with a user 102, one should appreciate that embodiments are not limited to those that involve a user. For example, authentication may be performed without any user.

Although features have been shown and described with reference to particular embodiments hereof, such features may be included and hereby are included in any of the disclosed embodiments and their variants. Thus, it is understood that features disclosed in connection with any embodiment are included in any other embodiment.

Further, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method, comprising:
   receiving, by a first device having a Wi-Fi connection to a computer network, security data from a second device having a cellular connection to the computer network and sharing the cellular connection with the first device by tethering the first device to the second device, the security data indicating a trusted relationship previously established between the second device and a server connected to the computer network;
   sending, by the first device, a request to the server to access a secured resource on the computer network, the request including an indicator based on the received security data from the second device and directing the server to perform authentication based at least in part on providing the indicator as an authentication factor, the indicator including a code that uniquely identifies the second device; and
   in response to authentication of the request based at least in part on the security data received from the second device, accessing the secured resource by the first device, including the first device initially communicating with the secured resource via the Wi-Fi connection and later communicating with the secured resource via the tethered, cellular connection in response to a reduction in signal strength and/or speed through the Wi-Fi connection,
   wherein the indicator includes a secure token generated or acquired by the second device, and wherein directing the server to perform authentication includes providing the secure token to the server as an authentication factor.

2. The method of claim 1, wherein the cellular connection is an LTE (Long Term Evolution) connection.

3. The method of claim 1, wherein sharing the cellular connection with the first device includes communicatively coupling the first device with the second device via one of (i) Bluetooth, (ii) Wi-Fi, or (iii) a cable.

4. The method of claim 1, wherein accessing the secured resource includes the first device in communication with the secured resource via the cellular connection.

5. The method of claim 1, wherein receiving the security data from the second device is performed in response to the first device becoming communicatively coupled to the second device.

6. The method of claim 1, where providing the indicator as an authentication factor includes transmitting the indicator to the server via the Wi-Fi connection.

7. The method of claim 1, where providing the indicator as an authentication factor includes transmitting the indicator as a silent authentication factor.

8. The method of claim 1, further comprising detecting the reduction in signal strength and/or speed through the Wi Fi connection by a sensor disposed in the first device.

9. The method of claim 8, wherein accessing the secured resource by the first device further includes, after communicating with the secured resource via the tethered, cellular connection, communicating with the secured resource via the Wi-Fi connection in response to a restoration of signal strength and/or speed through the Wi-Fi connection.

10. The method of claim 1, wherein the first device leverages the security data received from the second device to which the first device is tethered for accessing the secured resource.

11. A computerized device, having a Wi-Fi connection to a computer network and a processor coupled to memory to:
   receive security data from a second device having a cellular connection to the computer network, the second device configured to share the cellular connection with the computerized device by tethering the computerized device to the second device, the security data indicating a trusted relationship previously established between the second device and a server connected to the computer network;
   send a request to the server to access a secured resource on the computer network, the request including an indicator based on the received security data from the second device and directing the server to perform authentication based at least in part on providing the indicator as an authentication factor, the indicator including a code that uniquely identifies the second device; and
   in response to authentication of the request based at least in part on the security data received from the second device, access the secured resource, the access including the computerized device initially communicating with the secured resource via the Wi-Fi connection and later communicating with the secured resource via the tethered, cellular connection in response to a reduction in signal strength and/or speed through the Wi-Fi connection, wherein the indicator includes a secure token generated or acquired by the second device, and wherein directing the server to perform authentication includes providing the secure token to the server as an authentication factor.

12. The computerized device of claim 11, wherein the computerized device shares the cellular connection with the second device via one of (i) Bluetooth, (ii) Wi-Fi, or (iii) a cable.

13. The computerized device of claim 11, wherein the indicator includes a representation of an identity of the second device.

14. The computerized device of claim 11, wherein the indicator includes a secure token generated or acquired by the second device.

15. A computer program product including a set of non-transitory, computer-readable media having instructions which, when executed by control circuitry of a computerized apparatus, cause the computerized apparatus to perform a method, the method comprising:

receiving, by a first device having a Wi-Fi connection to a computer network, security data from a second device having a cellular connection to the computer network and sharing the cellular connection with the first device by tethering the first device to the second device, the security data indicating a trusted relationship previously established between the second device and a server connected to the computer network;

sending, by the first device, a request to the server to access a secured resource on the computer network, the request including an indicator based on the received security data from the second device and directing the server to perform authentication based at least in part on providing the indicator as an authentication factor, the indicator including a code that uniquely identifies the second device; and in response to authentication of the request based at least in part on the security data received from the second device, accessing the secured resource by the first device, including the first device initially communicating with the secured resource via the Wi-Fi connection and later communicating with the secured resource via the tethered, cellular connection in response to a reduction in signal strength and/or speed through the Wi-Fi connection, wherein the indicator includes a secure token generated or acquired by the second device, and wherein directing the server to perform authentication includes providing the secure token to the server as an authentication factor.

\* \* \* \* \*